United States Patent
Yamazaki

(10) Patent No.: US 8,798,390 B2
(45) Date of Patent: Aug. 5, 2014

(54) IMAGE PROCESSING APPARATUS, IMAGE PROCESSING METHOD, AND PROGRAM

(71) Applicant: Sony Corporation, Tokyo (JP)

(72) Inventor: Toshio Yamazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 55 days.

(21) Appl. No.: 13/674,530

(22) Filed: Nov. 12, 2012

(65) Prior Publication Data

US 2013/0156338 A1 Jun. 20, 2013

(30) Foreign Application Priority Data

Nov. 29, 2011 (JP) ................................ 2011-261034

(51) Int. Cl.
*G06K 9/40* (2006.01)
(52) U.S. Cl.
USPC .......................................... 382/264; 382/254
(58) Field of Classification Search
None
See application file for complete search history.

(56) References Cited

U.S. PATENT DOCUMENTS

2011/0187708 A1* 8/2011 Suzuki et al. ................. 345/419
2012/0188244 A1* 7/2012 Kida .............................. 345/426
2012/0294525 A1* 11/2012 Lukac ........................... 382/167
2013/0265496 A1* 10/2013 Cho et al. ...................... 348/607
2013/0294682 A1* 11/2013 Yamashita et al. ............ 382/154

FOREIGN PATENT DOCUMENTS

JP 11-120359 A 4/1999

* cited by examiner

*Primary Examiner* — Li Liu
(74) *Attorney, Agent, or Firm* — Wolf, Greenfield & Sacks, P.C.

(57) ABSTRACT

An image processing apparatus including: an error determination processing unit inputting a distance image having distance information or parallax information up to the subject, detecting an error signal included in the distance image, and outputting a synthesis coefficient according to an error degree of an image region unit; a low pass filter processing unit applying a low pass filter with respect to the distance image and generating a noise reduction distance image; and a distance image synthesis unit generating a corrected distance image using a synthesis process of the distance image and the noise reduction distance image, in which, the distance image synthesis unit follows a synthesis coefficient of an image region unit output by the error determination processing unit, performs synthesis processing in which the synthesis ratio of the distance image and the noise reduction image is set in the image region units, and generates the corrected distance image.

12 Claims, 22 Drawing Sheets

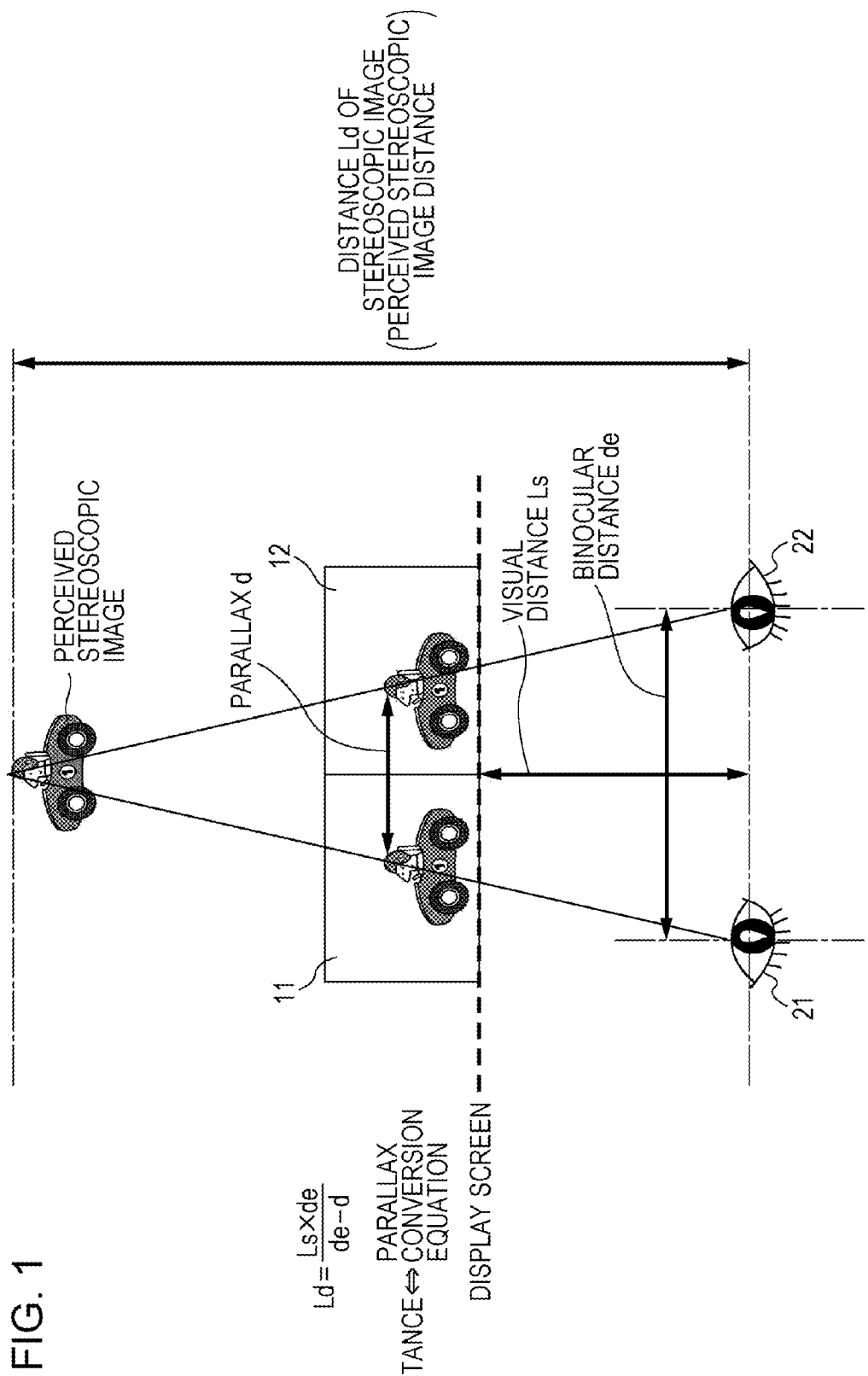

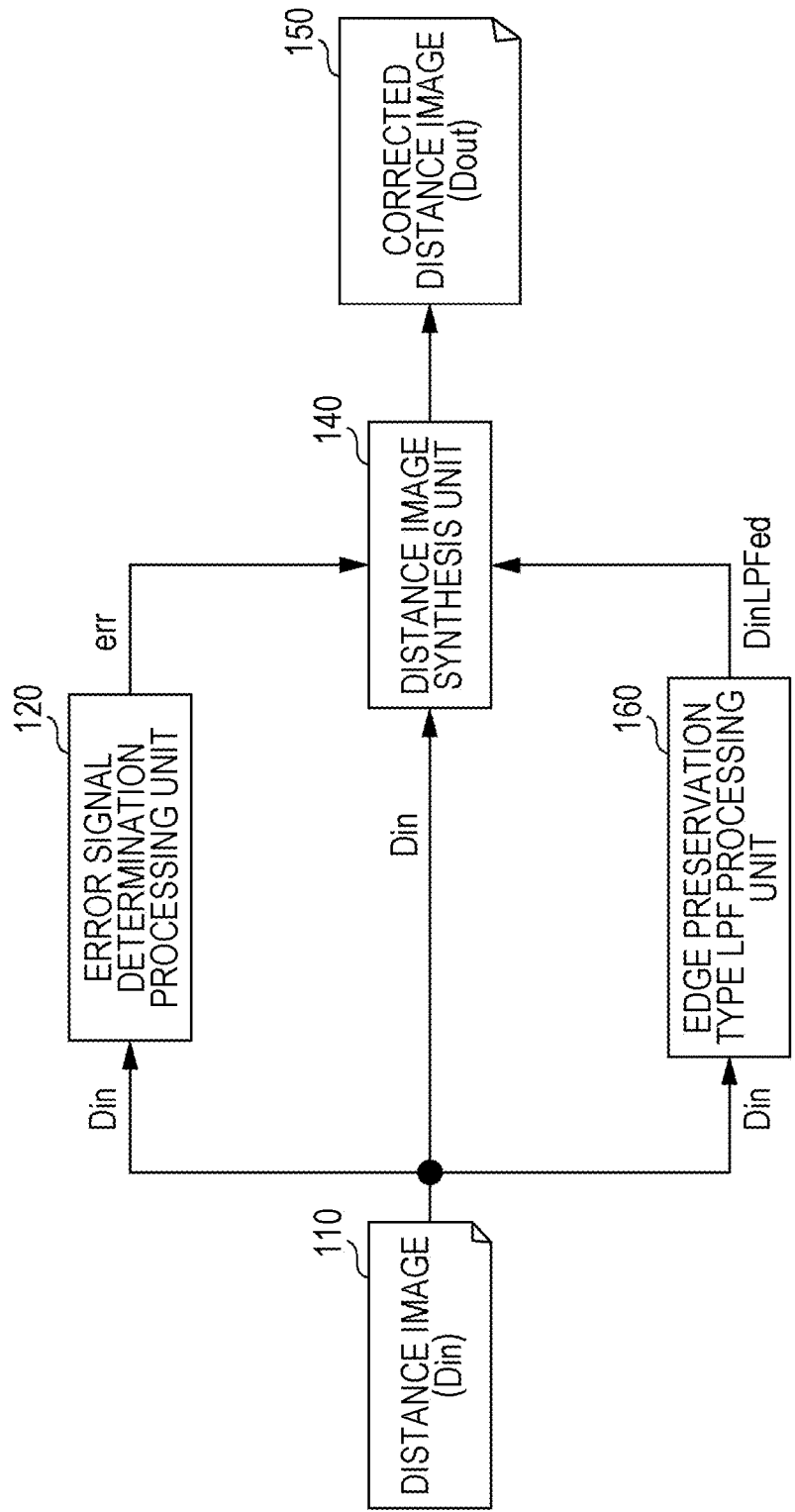

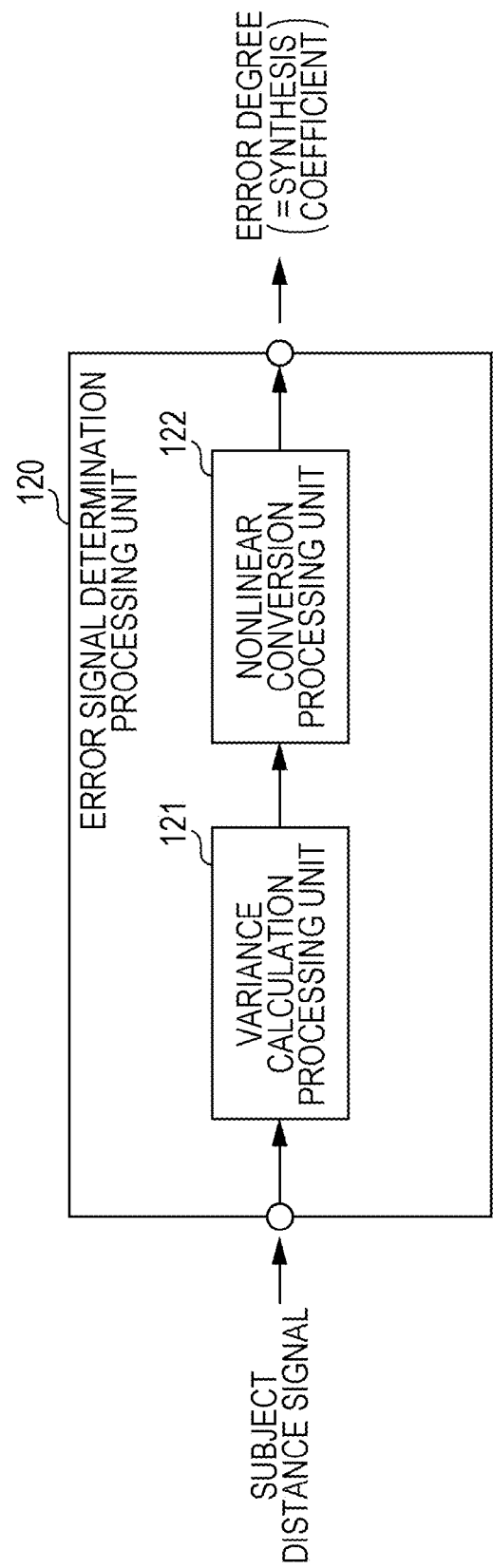

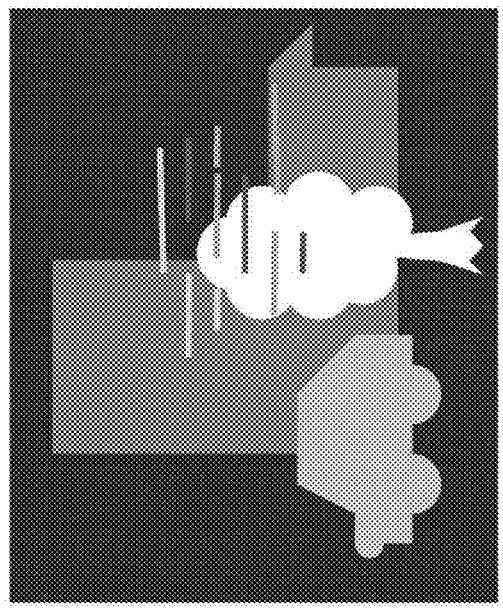
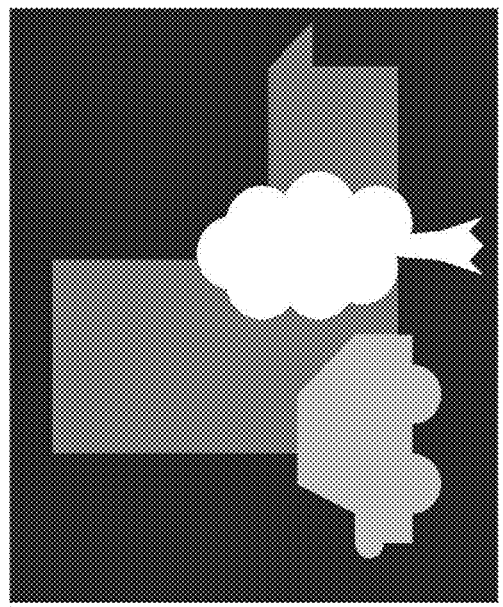

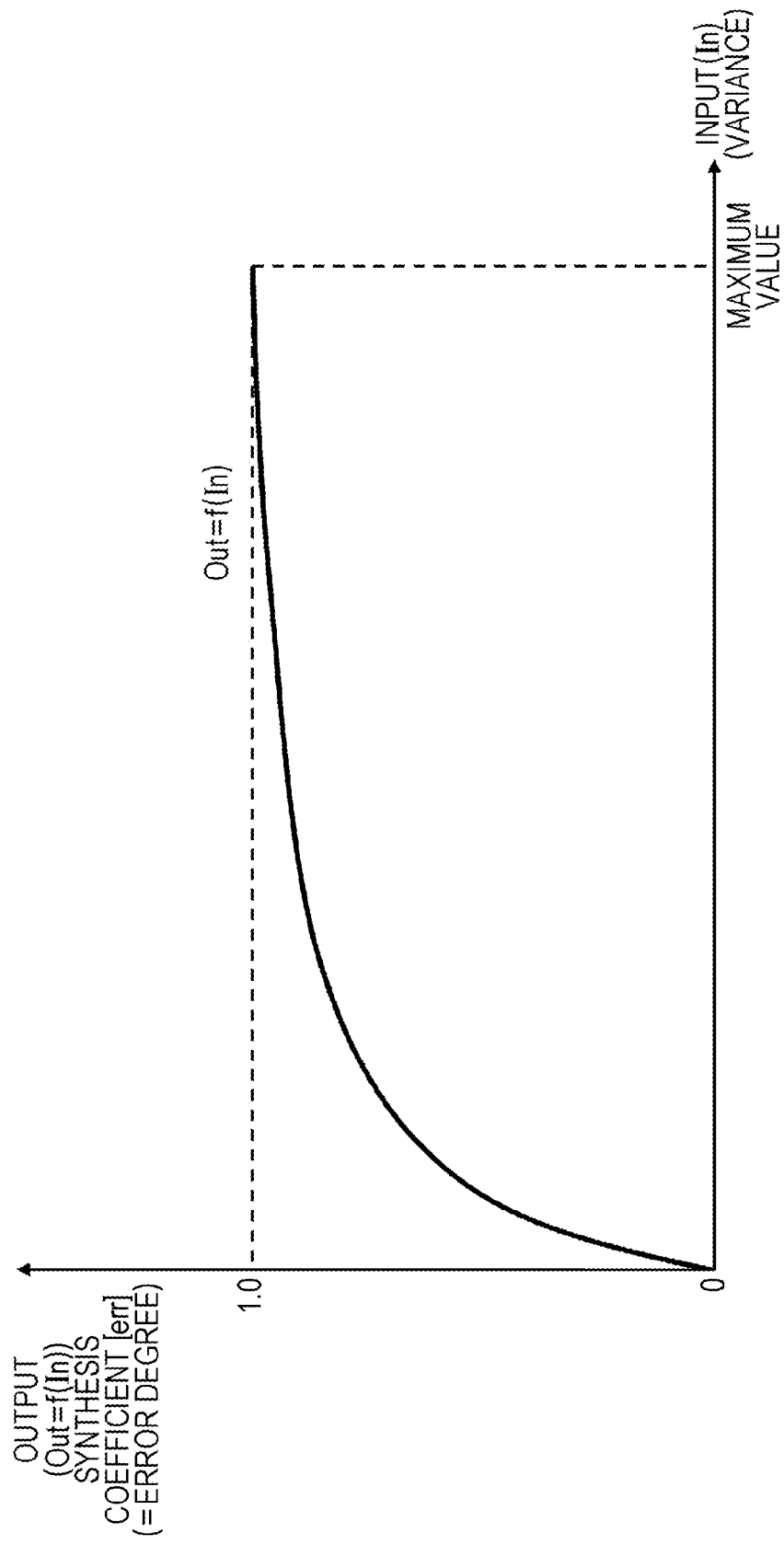

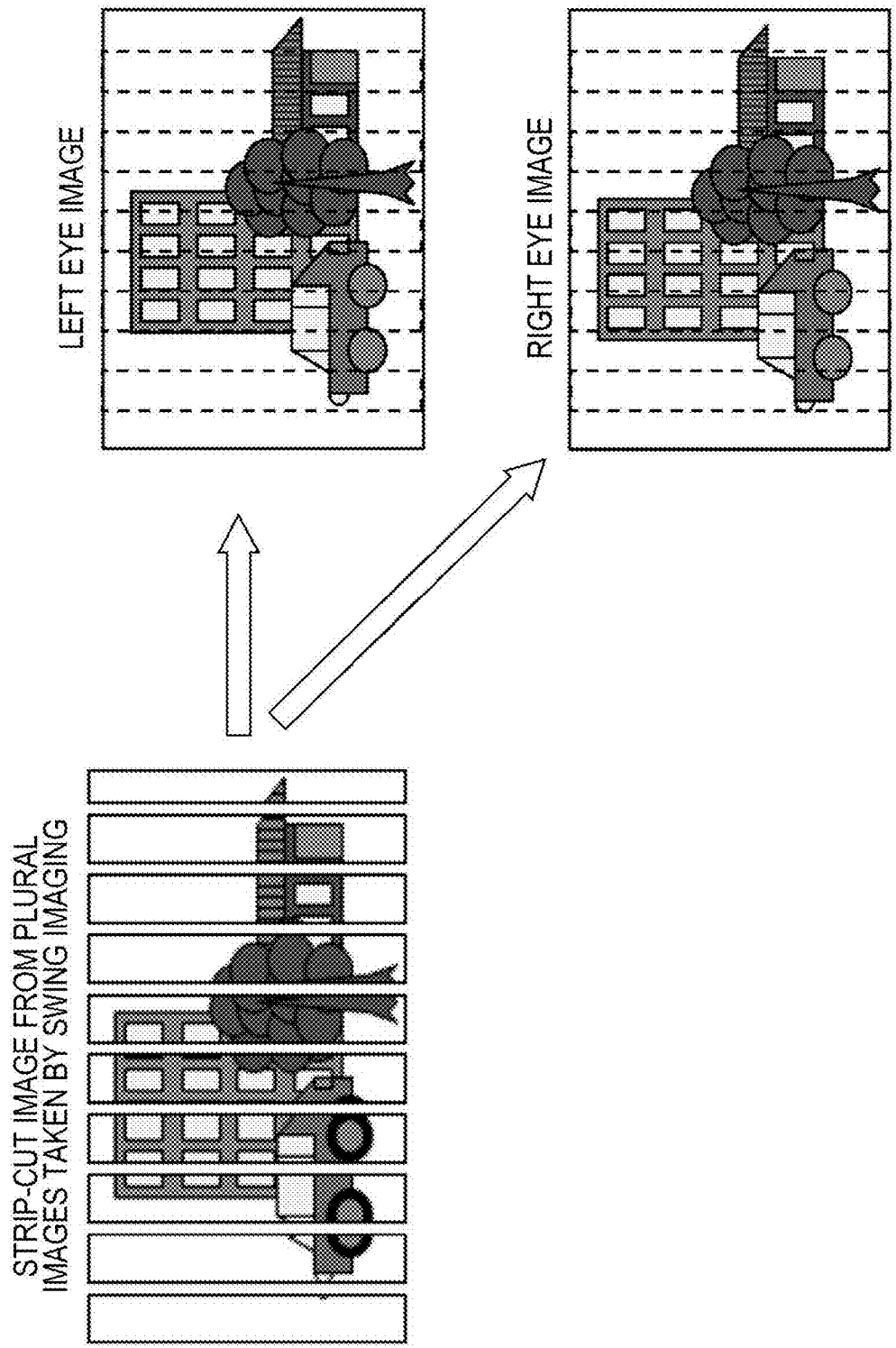

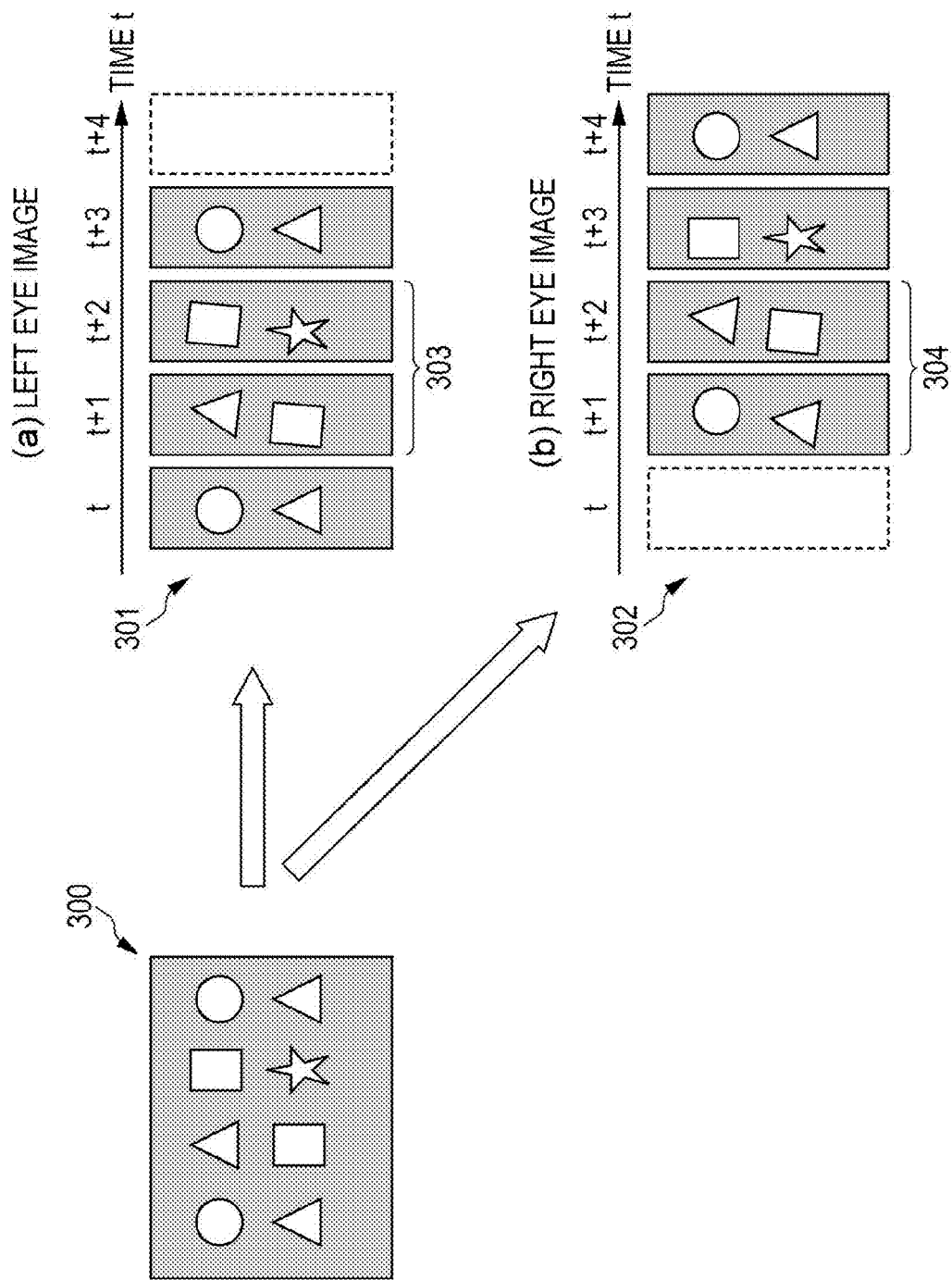

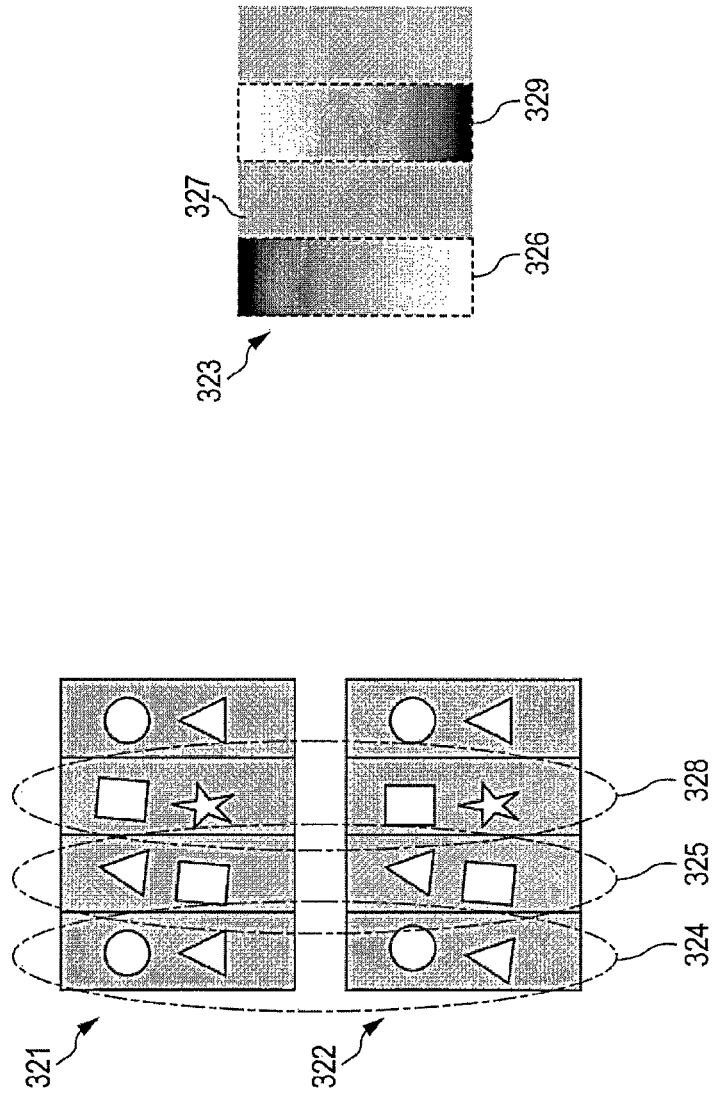

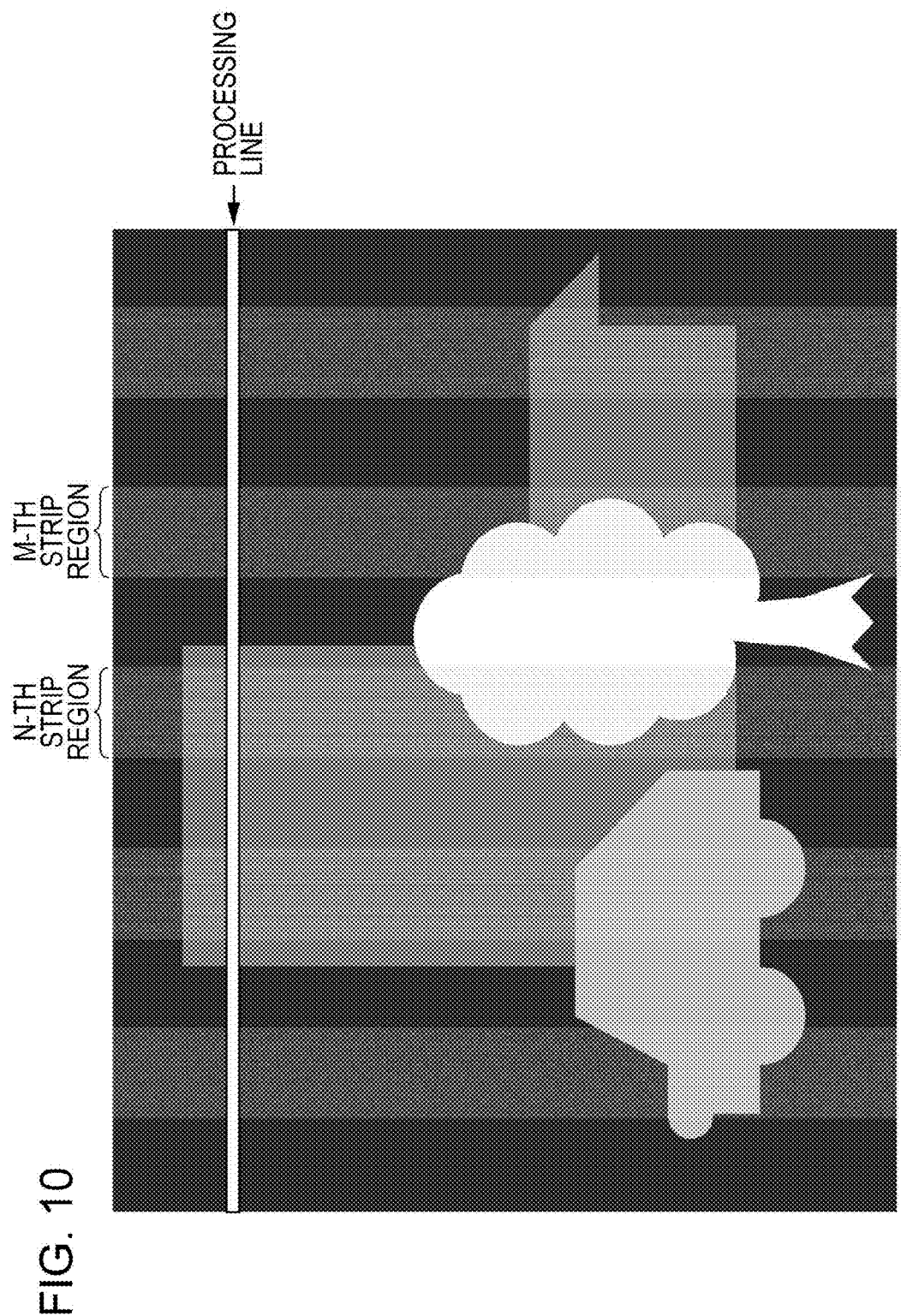

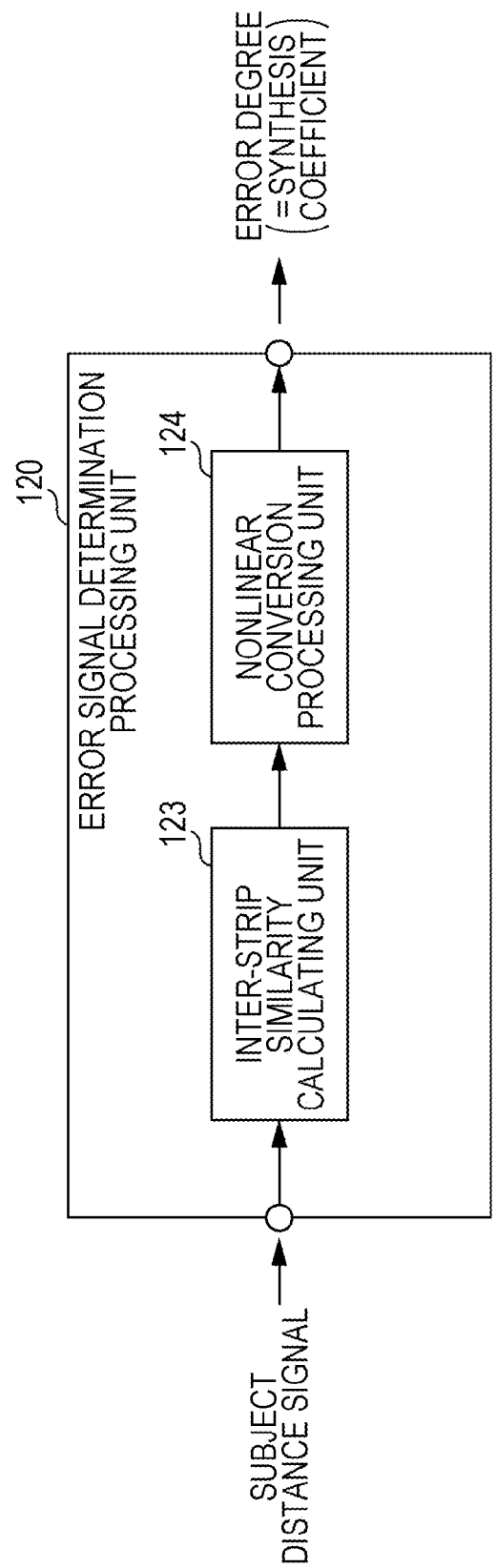

IMAGE PROCESSING APPARATUS, IMAGE PROCESSING METHOD, AND PROGRAM

CROSS REFERENCE TO RELATED APPLICATIONS

This application claims priority to Japanese Priority Patent Application JP 2011-261034, filed in the Japan Patent Office on Nov. 29, 2011, the entire contents of which are hereby incorporated by reference.

BACKGROUND

The present disclosure relates to an image processing apparatus, an image processing method, and a program. In particular, the present disclosure relates to an image processing apparatus, an image processing method, and a program for generating and correcting distance images (parallax images).

Recently, cameras capable of imaging stereoscopic images (also referred to as stereo images) have become widespread. For example, using stereo cameras in which lenses are lined up on the left and right, there are cameras imaging a binocular parallax image configured by a pair of a left eye image observed with the left eye and a right eye image observed with the right eye.

By respectively separating the above left eye image and right eye image and performing display thereof on a display apparatus (3D display apparatus) capable of performing presentation to the left eye and the right eye of an observer, the observer is able to view the image as a stereoscopic image, that is, a three-dimensional (3D) image.

The above left eye image and right eye image are capable of being used in a variety of applications as well as being viewed as a stereoscopic image. For example, it is possible to realize processes such as determining the distance from a camera with respect to an imaged subject as a stereoscopic image, cutting out an object on the image corresponding to the distance, and performing synthesis with another image, or reproducing a stereoscopic object in three-dimensional space.

The accurate computation of the distance from the camera to the imaging subject is one important factor in the application of the above kind of stereoscopic images. As a method of representing the information of the distance to the subject, for example, there is a distance image representing the value of the distance by shading the image. The subject distance corresponds to the parallax equivalent to the deviation in the pixel positions of the left eye image and the right eye image, and the distance image is also sometimes referred to as a parallax image.

Using the above distance image (parallax image), a process of cutting out an object on the image corresponding to a distance is performed. In this process, the precision of the distance image is an important point for improving quality.

There is disclosed related art relating to quality improvement of the distance image. For example, Japanese Unexamined Patent Application Publication No. 11-120359 proposes a method including: determining a distance image, setting distance values which are adjacent and which are close in the distance value to the same distance value, labeling the same distance values together, determining the area of each label, setting parallax to which a label of which the area is a fixed value or less is attached as noise, applying a median filter for noise removal with respect to pixels having a distance value set as noise, removing noise of the original image determined as the distance image, and improving the precision of the distance image determined from an original image.

However, although the above method has a local noise removal effect, there is a problem in that it is difficult to remove image errors of a wide range such as deviation of the image generated across a wide range. In addition, in the above-described Japanese Unexamined Patent Application Publication No. 11-120359, in order to determine the noise regions present in the image, the configuration includes performing a labeling process of divided region units of the image, determining the distance at each labelled region unit, computing the area of the distance units, and the like, whereby the processing costs are expected to increase.

SUMMARY

According to an embodiment of the present disclosure, there is provided an image processing apparatus, an image processing method, and a program for reducing processing costs, and generating more accurate distance images (parallax images).

According to an embodiment of the present disclosure, there is provided an image processing apparatus including: an error determination processing unit inputting a distance image having distance information or parallax information up to the subject, detecting an error signal included in the distance image, and outputting a synthesis coefficient according to an error degree of an image region unit; a low pass filter processing unit applying a low pass filter with respect to the distance image and generating a noise reduction distance image; and a distance image synthesis unit generating a corrected distance image using a synthesis process of the distance image and the noise reduction distance image, in which the distance image synthesis unit performs a synthesis process in which the synthesis ratio of the distance image and the noise reduction image is set in the image region units according to a synthesis coefficient of an image region unit output by the error determination processing unit, and generates the corrected distance image.

Further, according to the embodiment of the image processing apparatus of the present disclosure, the error determination processing unit includes a variance calculating processing unit computing a variance of divided region units of the distance image, and a nonlinear conversion processing unit computing the synthesis coefficient using a nonlinear conversion process of the variance of the divided region units computed by the variance calculating processing unit.

Further, according to the embodiment of the image processing apparatus of the present disclosure, the error determination processing unit includes an inter-strip similarity calculating unit determining the similarity between strip regions which are separated regions in which the distance image is separated unevenly or evenly at arbitrary widths in a lateral (horizontal) direction, and a nonlinear conversion processing unit computing the synthesis coefficient using a nonlinear conversion process of the inter-strip similarity computed by the inter-strip similarity calculating unit.

Further, according to the embodiment of the image processing apparatus of the present disclosure, the strip regions have the same width as the width of strips used at the time of generation processing of a stereo image configured by a left eye image and a right eye image applied in a three-dimensional image display.

Further, according to the embodiment of the image processing apparatus of the present disclosure, the inter-strip similarity calculating unit computes the sum of absolute differences of the distance signals between every other strip region in the distance image as the inter-strip similarity.

Further, according to the embodiment of the image processing apparatus of the present disclosure, the error determination processing unit includes an inter-strip unevenness determining unit detecting a state of unevenness of signal values between strip regions which are separated regions in which the distance image is separated unevenly or evenly at arbitrary widths in a lateral (horizontal) direction, and generating and outputting a synthesis coefficient reflecting the error degree.

Further, according to the embodiment of the image processing apparatus of the present disclosure, the inter-strip unevenness determining unit computes an average value of distance signals of three consecutive strip regions in the distance image, computes two differences of signal average values between adjacent strips from the three computed signal average values, determines the presence or absence of inter-strip unevenness based on the two computed differences, and generates and outputs a synthesis coefficient according to the determination result.

Further, according to the embodiment of the image processing apparatus of the present disclosure, the inter-strip unevenness determining unit computes and outputs an offset value for making average values of distance signals of three consecutive strip regions flat.

Further, according to the embodiment of the image processing apparatus of the present disclosure, the low pass filter processing unit performs an edge preservation type noise reduction process.

Further, according to the embodiment of the image processing apparatus of the present disclosure, the low pass filter processing unit applies the offset value and generates a noise reduction distance image by applying a low pass filter with respect to a distance image for which a correction process making the average values of distance signals of three consecutive strip regions flat has been performed.

Furthermore, according to another embodiment of the present disclosure, there is provided an image processing method performed in an image processing apparatus, the method including: inputting a distance image having distance information or parallax information up to the subject, detecting an error signal included in the distance image, and outputting a synthesis coefficient according to an error degree of an image region unit; applying a low pass filter with respect to the distance image and generating a noise reduction distance image; and generating a corrected distance image using a synthesis process of the distance image and the noise reduction distance image, in which, generating of the corrected distance image a synthesis process in which the synthesis ratio of the distance image and the noise reduction image is set in the image region units is performed according to a synthesis coefficient of an image region unit output in the inputting of the distance image, and the corrected distance image is generated.

Furthermore, according to still another embodiment of the present disclosure, there is provided a program causing an image processing apparatus to execute image processing including: inputting a distance image having distance information or parallax information up to the subject, detecting an error signal included in the distance image, and outputting a synthesis coefficient according to an error degree of an image region unit; applying a low pass filter with respect to the distance image and generating a noise reduction distance image; and generating a corrected distance image using a synthesis process of the distance image and the noise reduction distance image, in which, in the generating of the corrected distance image a synthesis process in which the synthesis ratio of the distance image and the noise reduction image is set in the image region units is performed according to a synthesis coefficient of an image region unit output in the inputting of the distance image, and the corrected distance image is generated.

Here, for example, the program of the embodiment of the present disclosure is a program which may be provided on a recordable medium provided in a computer-readable format or which may be provided by a communication medium, with respect to a general-purpose system capable of executing various types of programs and code. By providing the above program in a computer-readable format, processing according to the program may be realized on a computer system.

Other aims, characteristics, and advantages of embodiments of the present disclosure will be clarified by detailed description based on examples of embodiments of the present disclosure to be described later and the accompanying drawings. Here, the system in the specification is a logical group configuration of a plurality of apparatuses, and none of the apparatuses of the configuration are limited to being provided in the same housing.

According to one example configuration of the embodiments of the present disclosure, an image processing apparatus and method performing a correction process reducing the errors included in distance images or parallax images are realized.

Specifically, there is provided an error determination processing unit inputting a distance image having distance information or parallax information up to the subject, detecting an error signal included in the distance image, and outputting a synthesis coefficient according to an error degree of an image region unit; a low pass filter processing unit applying a low pass filter with respect to the distance image and generating a noise reduction distance image; and a distance image synthesis unit generating a corrected distance image using a synthesis process of the distance image and the noise reduction distance image, in which the distance image synthesis unit performs a synthesis process in which the synthesis ratio of the distance image and the noise reduction image is set in the image region units according to a synthesis coefficient of an image region unit output by the error determination processing unit, and generates the corrected distance image.

According to the above process, it is possible to generate corrected distance images or parallax images in which errors included in the distance images or parallax images are reduced.

BRIEF DESCRIPTION OF THE DRAWINGS

FIG. 1 is a diagram illustrating the perception principle of the stereoscopic image and the perception distance of the stereoscopic image.

FIG. 2 is a diagram illustrating a configurational example of the image processing apparatus.

FIG. 3 is a diagram illustrating an example of an error signal determination processing unit.

FIGS. 4A-B are diagrams illustrating examples of errors occurring in a distance image.

FIG. 5 is a diagram illustrating a process example computing a synthesis coefficient (err) from a variance performed by a nonlinear conversion processing unit in the error signal determination processing unit.

FIG. 7 is a diagram illustrating strip shape errors in the distance image.

FIG. 8 is a diagram illustrating reasons for the generation of strip shape errors in the distance image.

FIGS. 9A-B are diagrams illustrating reasons for the generation of strip shape errors in the distance image.

FIG. 10 is a diagram illustrating an effective method as an error determination process of a distance image generated by being gathered together in strip units.

FIG. 11 is a diagram illustrating an example of an error signal determination processing unit.

DETAILED DESCRIPTION OF EMBODIMENTS

Figure 6A:
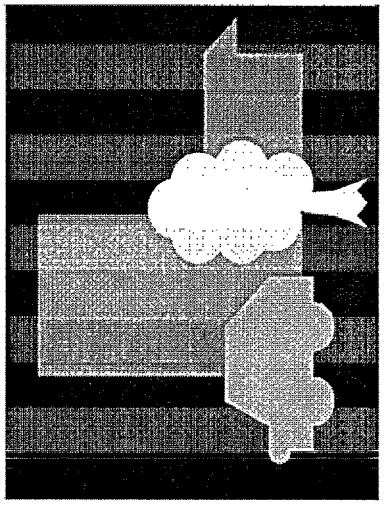
FIGS. 6A-B are diagrams illustrating strip shape errors in the distance image.

Hereinafter, the image processing device, the image processing method, and the program of embodiments of the present disclosure will be described in detail with reference to the drawings. The description will be given as follows.

1. Perception principle of stereoscopic image and perception distance of stereoscopic image
2. Configurational example of image processing apparatus
3. First configurational example of error signal determination processing unit
4. Description of errors occurring in strip units
5. Second configurational example of error signal determination processing unit
6. Third configurational example of error signal determination processing unit
7. Configurational example combining three types of error signal determination processing
8. Configurational example of edge preservation type LPF
9. Example of application applying a corrected high precision distance image obtained using the processes of an embodiment of the present disclosure
10. Summary of configuration of an embodiment of the present disclosure

[1. Perception Principle of Stereoscopic Image and Perception Distance of Stereoscopic Image]

Description will be given of the perception principle of the stereoscopic image and the distance of the stereoscopic image with reference to FIG. 1.

As shown in FIG. 1, the left eye image 11 is observed by the left eye 21 of an observer and the right eye image 12 is observed by the right eye 22. In the left eye image 11 and the right eye image 12, there is positional deviation (parallax) of the image corresponding to the subject distance, the perception distance changes according to the above parallax, whereby the observer is able to observe a stereoscopic image.

In the left eye image 11 and the right eye image 12, deviation of pixel position of the same subject=parallax d is set, and distance of perceived stereoscopic image: perception stereoscopic image distance Ld is set.

The relationship between the above parallax d and the perception stereoscopic image distance Ld is shown by the following (Formula 1) when the distance from the position of the eye of the observer to the display screen: visual distance=Ls, and the interval between both eyes of the observer=de.

$$L_d = \frac{L_s \times d_e}{d_e - d} \qquad \text{(Formula 1)}$$

In this manner, when the visual distance Ls is determined, the parallax d and the perception stereoscopic image distance Ld are interdependent data corresponding one to one in which, when one value is determined, the other value is determined.

That is, as described above, (a) perception stereoscopic image distance Ld: distance perceived by observer (≈subject distance), (b) parallax d: deviation amount of pixel position of the same subject in the left eye image and the right eye image, and the above values of (a) and (b) are interdependent data corresponding one to one.

In the following description of the examples, description will be given of the setting of a process using perception stereoscopic image distance (subject distance) data; however, it is also possible to perform the setting of a process applying parallax data instead of subject distance data.

In the following description, the distance image will be described as an image having distance information or parallax information up to the subject.

[2. Configurational Example of Image Processing Apparatus]

FIG. 2 is a diagram illustrating a basic configurational example of the image processing apparatus of an embodiment of the present disclosure. A distance image 110 is determined from a left eye image and a right eye image which is capable of being viewed in stereo. The distance image is an image showing the subject distance (perception stereoscopic image distance=distance from observer or imaging camera) on an imaged image as shading image information of from black to white, for example.

Here, as described above, the subject distance is determined from parallax corresponding to the deviation amount of the corresponding pixel positions in the left eye image and the right eye image. Accordingly, shading information corresponding to the distance also shows the parallax amount at the same time as showing the subject distance, and the distance image is also referred to as a parallax image.

That is, distance images and parallax images are equivalent image data.

In the following examples, description will be given of the setting of an example applying a distance image having data (distance signal) according to the distance up to the subject in pixel units; however, it is also possible to perform the setting of a process applying a parallax image having a parallax signal in pixel units instead of the distance image.

Accordingly, in the following description, the distance image will be described as an image having distance information or parallax information up to the subject.

As shown in FIG. 2, the distance image 110 is input to an error signal determination processing unit 120, a distance image synthesis unit 140, and an edge preservation type LPF processing unit 160.

The error signal determination processing unit 120 inputs the distance image 110, analyzes a distance signal (=parallax signal) showing the subject distance included in the distance image 110, and outputs the degree of error determining whether or not errors are generated in the distance signal (parallax signal) as a numerical value.

As an error determination process performed in the error signal determination processing unit 120, for example, any of the following values or a plurality of values are computed, and an error determination process is performed based on these computed values.

(1) Variation degree (variance) of predetermined region units of the distance image (2) Value showing the similarity degree between strips of the distance image (3) Value showing the unevenness degree between strips of the distance image Here, the strips used in the above-described (2) and (3) signify separated regions unevenly or evenly separating the distance image 110 at arbitrary widths in a lateral (horizontal) direction.

Detailed description will be given of these process at a later stage.

As shown in FIG. 2, the distance image 110 is input to the edge preservation type LPF processing unit 160.

The edge preservation type LPF processing unit 160 performs a filter application process removing noise included in the distance image 110. The edge preservation type LPF processing unit 160 performs a filter process applying a low pass filter (LPF) of an edge preservation type.

The above LPF process may be a generally used edge preservation type LPF, for example, an ϵ filter, a bilateral filter, or the like may be used.

In the edge preservation type LPF processing unit 160, the LPF-processed distance image is synthesized with the original distance image 110 in the distance image synthesis unit 140.

The synthesis process performs the synthesis processing according to the numerical value showing the error degree of the region units output from the error signal determination processing unit 120.

Here, the numerical values showing the error degree of the region units output from the error signal determination processing unit 120 are set to error degree=0.0 to 1.0.

0.0 indicates that the error degree is the lowest, and 1.0 indicates that the error degree is the highest.

The distance image synthesis unit 140 applies the error degree of the region units output from the error signal determination processing unit 120 as a synthesis coefficient (err) and performs the synthesis process according to the following (Formula 2).

$$D_{out}=D_{in}\times(1-err)+D_{inLPFed}\times err \quad \text{(Formula 2)}$$

However,

Dout: pixel values (distance signal) of the corrected distance image 150 after synthesis, Din: pixel values (distance signal) of the input original distance image 110, err: error degree (=synthesis coefficient)

DinLPFed: LPF-processed distance image in the edge preservation type LPF processing unit 160

The above-described (Formula 2) shows a process of generating a corrected distance image 150 using a synthesis process (blending process) in which the synthesis ratio (blend ratio) of the distance image LPF-processed in the edge preservation type LPF processing unit 160 is set to be high for high error degree pixel regions of the input distance image 110, and the synthesis ratio (blend ratio) of the input distance image is set to be high for low error degree pixel regions of the input distance image 110.

According to the above-described (Formula 2), the distance image synthesis unit 140 performs a synthesis process of the LPF-processed distance image and the original distance image 110.

The synthesis-processed distance image is output as the corrected distance image 150.

[3. First Configurational Example of Error Signal Determination Processing Unit]

FIG. 3 shows an example of the error signal determination processing unit 120.

As shown in FIG. 3, the error signal determination processing unit 120 has a variance calculating processing unit 121, and a nonlinear conversion processing unit 122.

In the variance calculating processing unit 121, the distance image 110 input to the error signal determination processing unit 120 is first separated into divided regions of N×M pixels defining the distance image in advance, and then the variance of the pixel values is calculated in the divided region units.

Here, as described above, the distance image is an image having pixel values according to the subject distance.

FIGS. 4A-B illustrate example images of a case where no errors occur in a distance image and a case where errors do occur.

FIG. 4A—distance image with no errors

FIG. 4B—distance image in which errors occur

Examples of the above two images are shown.

As shown in the drawing, in places in (b) the distance image in which errors occurred, a region (black line shown in the drawing) having pixel values greatly different to the periphery is generated.

In this manner, in the region in which errors occurred, the variation degree of the pixel values (distance signal) of the distance image become large. This example uses variance for using the variation degree in the determination of the error signal.

However, in the above configuration, since it is sufficient to determine the variation degree of the region units in the distance image, as long as the index value is a value having a correlation with the variation degree, it is not limited to the variance, and other index values may be used. For example, a configuration may be adopted using the standard deviation of the pixel values of the divided region units.

The variance of the divided region (N×M pixels) units determined in the variance calculation processing unit 121 shown in FIG. 3 is input to the nonlinear conversion processing unit 122.

The nonlinear conversion processing unit 122 performs a process of converting the variance showing the variation degree of the divided region units of the distance image into a synthesis coefficient (err) used in the distance image synthesis unit 140.

FIG. 5 shows an example of a nonlinear conversion process performed in the nonlinear conversion processing unit 122. The horizontal axis is the input signal (variance) from the variance calculating processing unit 121. The vertical axis shows the output after the nonlinear conversion process in the nonlinear conversion processing unit 122, that is, the synthesis coefficient (err).

The nonlinear conversion processing unit 122 converts the input variance (In) using a function f(x) defined in advance and outputs a synthesis coefficient [err] (Out). That is, the following is set.

$$Out = f(In)$$

A variety of functions may be used as the function f(x) applied in this conversion process.

For example, as an example of the function f(x), it is possible to apply the exponential function shown in the following (Formula 3).

$$F(x) = x^\beta \quad \text{(Formula 3)}$$

The nonlinear conversion processing unit 122 applies the exponential function as shown in the following (Formula 3), performs a nonlinear conversion process of the input variance (In), and generates and outputs a synthesis coefficient (err), which is to be output, from the input variance (In) as shown in FIG. 5, for example.

Here, in the above-described (Formula 3), β is a coefficient set in advance and may be set to various values. In addition, the conversion function in the nonlinear conversion processing unit 122 is not limited to an exponential function, and a linear conversion may also be performed.

[4. Description of Errors Occurring in Strip Units]

Figure 6B:
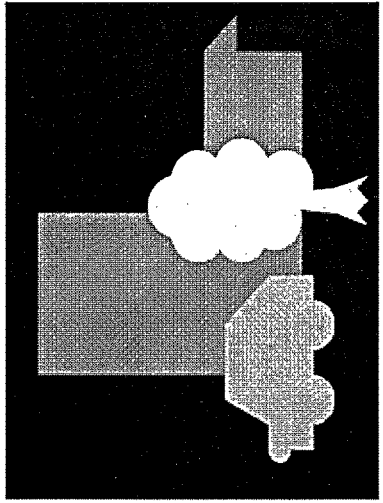

In FIGS. 6A-B, another example of errors occurring in the distance image is shown. In this example, an error of the distance signal is generated in a strip shape.

These strip unit errors are easily generated in a case where a plurality of imaged images which are continuously imaged by moving (swinging) a camera in a horizontal direction are used, strip images cut out into strip shapes from each image are re-synthesized, and a process generating a left eye image and a right eye image to be applied to a 3D image display is performed.

Generation examples of the left eye image and the right eye image in which these kinds of errors occur are shown in FIG. 7. As shown in FIG. 7, the method is a method of generating a left eye image and the right eye image by re-synthesizing the strip images cut out from the plurality of imaged images continuously imaged by moving (swinging) in the horizontal direction.

When this kind of 3D image generation process is performed, there are cases where errors such as adding an offset to the strip shape as shown in FIGS. 6A-B are generated.

The reasons for the generation of these kinds of errors will be described with reference to FIG. 8 and FIGS. 9A-B.

In the stereo image imaging method synthesizing strip shape images as a left eye image and a right eye image as shown in FIG. 7, in order to construct the strips for constructing the left eye image and the right eye image, different imaging positions are used in the left eye image and the right eye image, that is, strips cut out from imaged images having different imaging times are used.

For example, the strip image 301 for constructing the (a) left eye image corresponding to the image 300 and the strip image 302 for constructing the (b) right eye image are generated as shown in FIG. 8 using a process of synthesizing strip images cut out from a plurality of continuously imaged images at each imaging time t, t+1, t+2, . . . as shown in the drawing.

As shown in FIG. 8, by cutting out and synthesizing strips from the plurality of images imaged from time t to t+4, an (a) left eye image and a (b) right eye image are generated.

For example, the images of each of these strip regions are images imaged by a photographer swinging a camera in the horizontal direction by hand. During this imaging process, as long as movement is accurately performed only in the horizontal direction, there are no problems; however, in many cases, movement in the orthogonal direction, rotation, or the like of the camera are generated.

For example, at the time t+1 and t+2, rotational movement centered on an axis in the subject direction is added to the camera.

For example, strips are shown in which strips of (a) a strip image 303 configuring a left eye image and (b) a strip image 304 configuring a right eye image are rotated by the rotational movement and imaged.

As is apparent from these strip images 303 and 304, as a result of the rotational movement, a phenomenon occurs in which the same subject is photographed at different angles.

As shown in FIG. 9A, the results of synthesizing the strips in which such rotational movement occurred are used as the left eye image 321 and the right eye image 322.

A distance image determined from the left eye image 321 and the right eye image 322 is shown in FIG. 9B as a distance image 323.

In general, for the distance image, the distance to the subject is determined by determining the parallax between the same subject on the left eye image and the right eye image.

In FIG. 9A, for example, the distance is determined from parallax between strips of the left eye image shown by the strip images 324, 325, and 328 and strips of the right eye image.

Since rotational movement centered on an axis in the subject direction is added to the camera at the time t+1 and t+2, this example focuses on a set of the strip of the left eye image and the strip of the right eye image of strips 324.

In the set of these strips, the strip of the left eye image is normal and rotational movement is added to the strip of the right eye image.

As a result, in the distance image 323, the strip region 326 of the distance image determined from the set of the strips 324 becomes a distance image in which errors are included.

In addition, in the set of the strips 325, rotational movement is added to both of the strip of the left eye image and the strip of the right eye image, and, since the same rotational movement is added to both strips, the strip region 327 of the determined distance image is a correct distance image.

In addition, in the set of the strips 328, for the same reason as strips 324, the strip region 329 of the distance image becomes a distance image in which errors are included.

In this manner, in the distance image, the errors of the distance image of a case where rotational movement centered on an axis in the subject direction is added to the camera occur in every other strip region of the distance image.

In the error determination of this kind of strip unit, it is impractical to apply a method of determining variation of the pixel region units described in the above-mentioned FIG. 3, that is, a method of computing variance of the pixel values of N×M pixel units of the distance image and determining errors based on the variance.

[5. Second Configurational Example of Error Signal Determination Processing Unit]

Description will be given below of an effective method as an error determination process of a distance image generated by gathering the above-described strip units.

With reference to FIG. 10, a brief description will be given of an example of such an error determination method.

In the above-described generation of a stereo image using the images imaged on the strips, errors in the distance signal included in the distance image are generated between the strips rather than in the strips. Thus, the distance image is separated at the same position as the strips to which image generation of the left eye image and the right eye image as a stereo image has been applied. Of course, this may be a virtual division.

Next, a processing line in the horizontal direction, which detects errors in the distance signal included in the distance image, is set.

Since errors occur between the strips, by comparing the N-th strip and the M-th strip of the processing line, it is determined whether or not errors occur in these strips. In this method, as a determination method, the similarity between the N-th strip and the M-th strip of horizontal processing line is determined, and if the similarity is large, it is determined that errors have occurred.

FIG. 11 illustrates a configurational example of the error signal determination processing unit 120 using this error determination method.

The error signal determination processing unit 120 shown in FIG. 11 illustrates one configurational example of the error signal determination processing unit 120 of the previously described image processing apparatus of FIG. 2, and, in particular, has an effective configuration for detecting errors in the strip units.

Description will be given of the configuration and process of the error signal determination processing unit 120 shown in FIG. 11.

As shown in FIG. 11, the error signal determination processing unit 120 includes
  an inter-strip similarity calculating unit 123, and
  a nonlinear conversion processing unit 124.

For the distance image 110 input to the error signal determination processing unit 120, in the inter-strip similarity calculating unit 123, the similarity is calculated using an arbitrary N-th strip and an M-th strip in the processing line units of the horizontal direction described with reference to FIG. 10.

Figure 12:
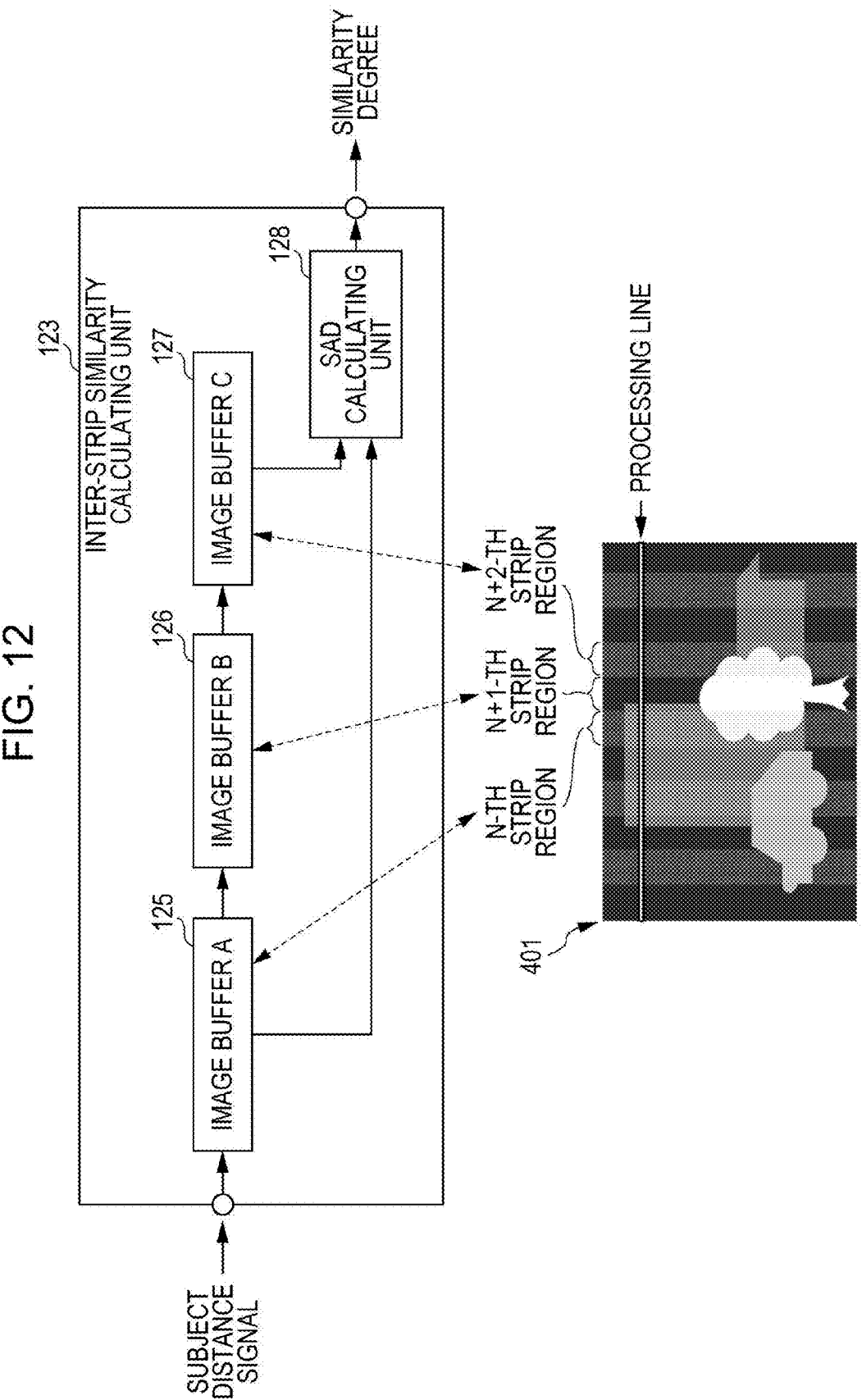
FIG. 12 is a diagram illustrating a configurational example of an inter-strip similarity calculating unit of the error signal determination processing unit.

With reference to FIG. 12, description will be given of the detailed configuration and processing of the inter-strip similarity calculating unit 123.

The distance signal of the distance image 110 is input to the inter-strip similarity calculating unit 123 according to the scanning line in the horizontal direction.

The distance signal input according to the scanning lines is stored in processing line units in the image buffer A125, image buffer B126, and image buffer C127. The width of each buffer is equal to the strips.

As shown in FIG. 12, for example, the stored data of each buffer stores a distance image of a strip unit of the distance image 401 shown in FIG. 12. That is, the following distance signal data are stored:
  in the image buffer A125, distance image data formed of a distance signal of the N-th strip,
  in the image buffer B126, distance image data formed of a distance signal of the N+1-th strip, and
  in the image buffer A127, distance image data formed of a distance signal of the N+2-th strip.

A SAD (Sum of Absolute Difference) calculating unit 128 computes the sum of the absolute difference of the distance signal between every other strip of the same horizontal lines stored in the image buffer A125 and the image buffer C127.

The SAD calculating unit 128 computes the SAD (sum of the absolute difference) $R_{SAD}$ between every other strip according to the following (Formula 4).

$$R_{SAD} = \sum_{i=0}^{N} |D_A(i) - D_C(i)| \qquad \text{(Formula 4)}$$

Here,
DA(i): distance signal of position i of image buffer A125
DC(i): distance signal of position i of image buffer C127
$R_{SAD}$: SAD (sum of the absolute difference)
N: size of image buffer A125

The sum of the absolute difference shows the similarity between each strip. The sum of the absolute difference (SAD value) computed by the SAD calculating unit 128 is output to the nonlinear conversion processing unit 124.

The nonlinear conversion processing unit 124 applies the nonlinear conversion function (fx) shown in, for example, FIG. 5, described previously in the examples, performs a nonlinear conversion process of the above-described SAD (sum of the absolute difference) $R_{SAD}$, and generates and outputs a synthesis coefficient (err) to be output to the distance image synthesis unit 140.

Here, in this example, description has been given of a process example applying the SAD (sum of the absolute difference) as the index value showing the similarity of the signals between each strip; however, a configuration using another algorithm determining the similarity may be adopted. For example, in addition to the SSD (Sum of Squared Difference), it is possible to use normalized cross-correlation or the like.

In addition, in the configuration shown in FIG. 12, by matching the buffer size with the strip width and using three buffers, the similarity between the N-th strip and the N+2-th strip is calculated; however, since this configuration depends on the manner in which the original stereo image was generated from the strips, the present disclosure is not limited to this configuration.

For example, in a case where the widths of the strips are uneven, there is a demand for a configuration which is capable of determining the similarity according to the strip widths using the inputting of the strip boundary information and a device for acquiring a distance signal, which is in the range of the strips to be compared, from the distance signal.

[6. Third Configurational Example of Error Signal Determination Processing Unit]

Next, with reference to FIG. 13 below, description will be given of one more process example of an error determination process of the strip units described with reference to FIGS. 6A-B, 7, 8 and 9A-B.

In a case where errors are generated in the strip units described with reference to FIGS. 6A-B, 7, 8 and 9A-B, focusing on the average value of the distance signals of the strip units, the average value changes greatly in the strip units.

As described with reference to FIGS. 8 and 9A-B above, there is a high possibility that the strips in which errors occur will be set at every other strip.

Therefore, for the distance image including the strips in which errors occur, there is a tendency for the average value of the distance signal of the strips to be greatly different in every other strip. That is, the average values of the distance signals are uneven between the strips. Thus, it is possible to determine that there is an error in a case where it is detected that the parallax is uneven in the strip units.

Figure 13:
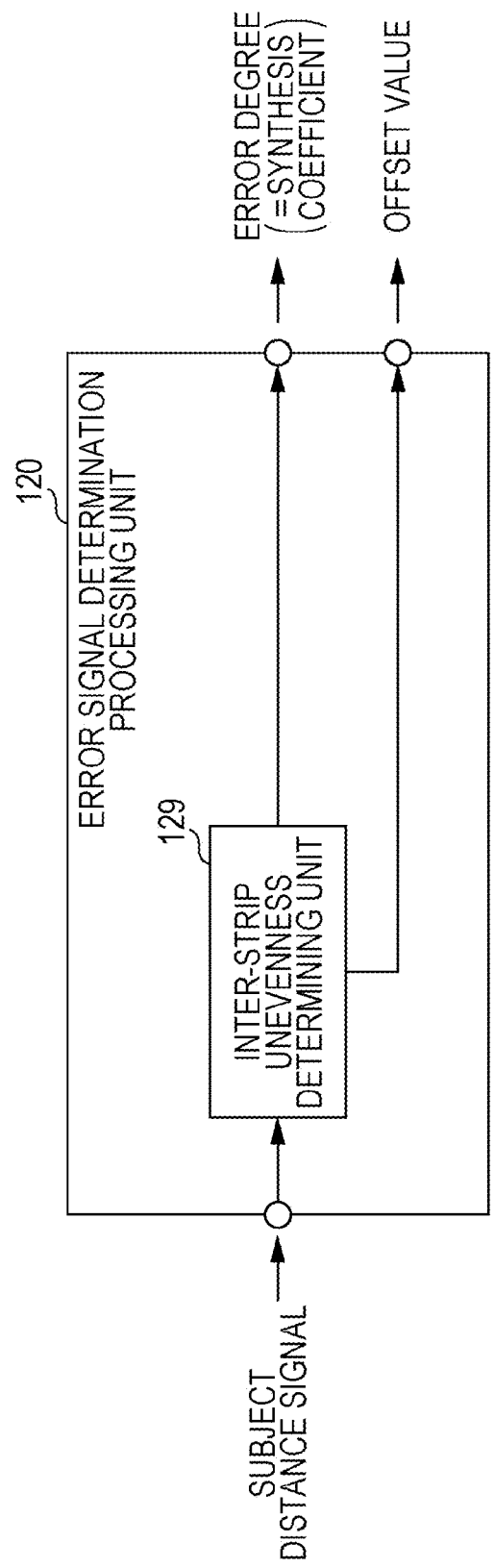
FIG. 13 is a diagram illustrating an example of an error signal determination processing unit.

FIG. 13 shows an example of the error signal determination processing unit 120 using this method.

The error signal determination processing unit 120 shown in FIG. 13 illustrates one configurational example of the error signal determination processing unit 120 of the previously described image processing apparatus of FIG. 2, and, in particular, has an effective configuration for detecting errors in the strip units.

As shown in FIG. 13, the error signal determination processing unit 120 in this processing example includes an inter-strip unevenness determining unit 129.

For the distance image 110 input to the error signal determination processing unit 120, in the inter-strip unevenness determining unit 129, it is determined whether or not unevenness is present in the average values of the distance signals of each strip between the N-th, N+1-th, and N+2-th strips along the processing line of the horizontal direction previously described with reference to FIG. 10.

Figure 14:
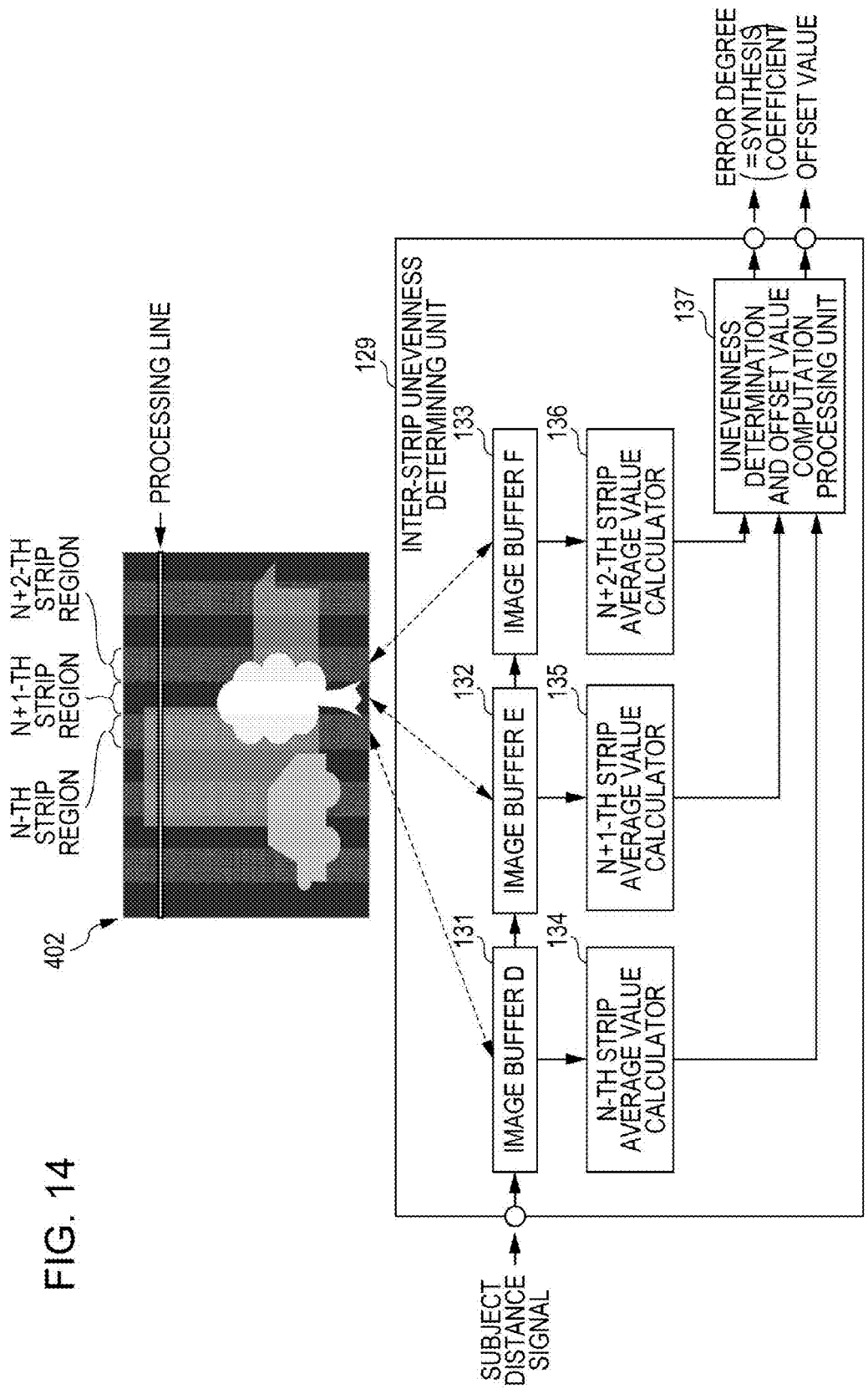
FIG. 14 is a diagram illustrating the configuration of an inter-strip unevenness determining unit of the error signal determination processing unit.

With reference to FIG. 14, description will be given of the detailed configuration and processing of the inter-strip unevenness determining unit 129.

The distance image 110 input to the error signal determination processing unit 120 is sent to and stored in an image buffer D131, an image buffer E132, and an image buffer F133 in processing line units.

The width of each buffer is equal to a strip.

As shown in FIG. 14, for example, stored data of each buffer stores a distance image of a strip unit of the distance image 402 shown in FIG. 14. That is, the following distance signal data are stored:

in the image buffer D131, distance image data formed of a distance signal of the N-th strip, in the image buffer E132, distance image data formed of a distance signal of the N+1-th strip, and in the image buffer F133, distance image data formed of a distance signal of the N+2-th strip.

Based on the distance image data stored in each buffer, in the average value calculator 134 of the N-th strip, the average value calculator 135 of the N+1-th strip, and the average value calculator 136 of the N+2-th strip, the average value of each strip of each of the N-th to N+2-th strip regions is calculated.

In an unevenness determination and offset value computation processing unit 137, the relationship of the average values of the N-th strip, N+1-th strip, and N+2-th strip determines whether either of the following (1) or (2) is established or not (1) N-th average value<N+1-th average value, and N+1-th average value>N+2-th average value, (2) N-th average value>N+1-th average value, and N+1-th average value<N+2-th average value.

When the above-described (1) or (2) is satisfied, a synthesis coefficient (err) determined as an error is output to a distance image synthesis unit 140 as err=1.0 in the present embodiment.

When either of the above-described (1) or (2) is not satisfied, a synthesis coefficient (err) which is not determined as an error is output to the distance image synthesis unit 140 as err=0.0 in the present embodiment.

Here, in the configuration shown in FIG. 14, by matching the buffer size with the strip width and using three buffers, the average value of the N-th strip, the N+1-th strip, and the N+2-th strip is determined and unevenness determination is performed; however, since this configuration depends on the manner in which the original stereo image was generated from the strips, the present disclosure is not limited to this configuration.

For example, in a case where the widths of the strips are uneven, there is a demand for a configuration which is capable of determining the similarity according to the strip widths using the inputting of the strip boundary information and a device for acquiring a distance signal, which is in the range of the strips to be compared, from the distance signal.

Next, description will be given of the offset value to be determined by the unevenness determination and offset value computation processing unit 137. An example of using the offset value will be described later.

In a case where the average value of the distance signal between the strips is detected as uneven, it is considered that error correction is possible by flattening the average values of the strips.

Therefore, in the present embodiment, the offset value of the distance signal according to the following (Formula 5) is computed such that the average values of the distance signals of the N-th strip, the N+1-th strip, and the N+2-th strip become flat.

$$\text{offset value} = \left(\frac{Ave_N + Ave_{N+2}}{2} Ave_{N+1}\right) \times \frac{1}{2} \quad \text{(Formula 5)}$$

Here,

AveN: average value of the distance signal of the N-th strip

AveN+1: average value of the distance signal of the N+1-th strip

AveN+2: average value of the distance signal of the N+2-th strip

Here, in the above-described (Formula 5), the section of (x1/2) is an adjustable parameter determining the strength of the effect of the offset value, and it is preferable that adjustment of changing to the optimal value be performed by viewing the effects. The offset value determined according to the above-described formula is used in a correction process of the inter-strip unevenness correction unit 170 to be described later.

[7. Configuration Example Combining Three Types of Error Signal Determination Processes]

Figure 15:
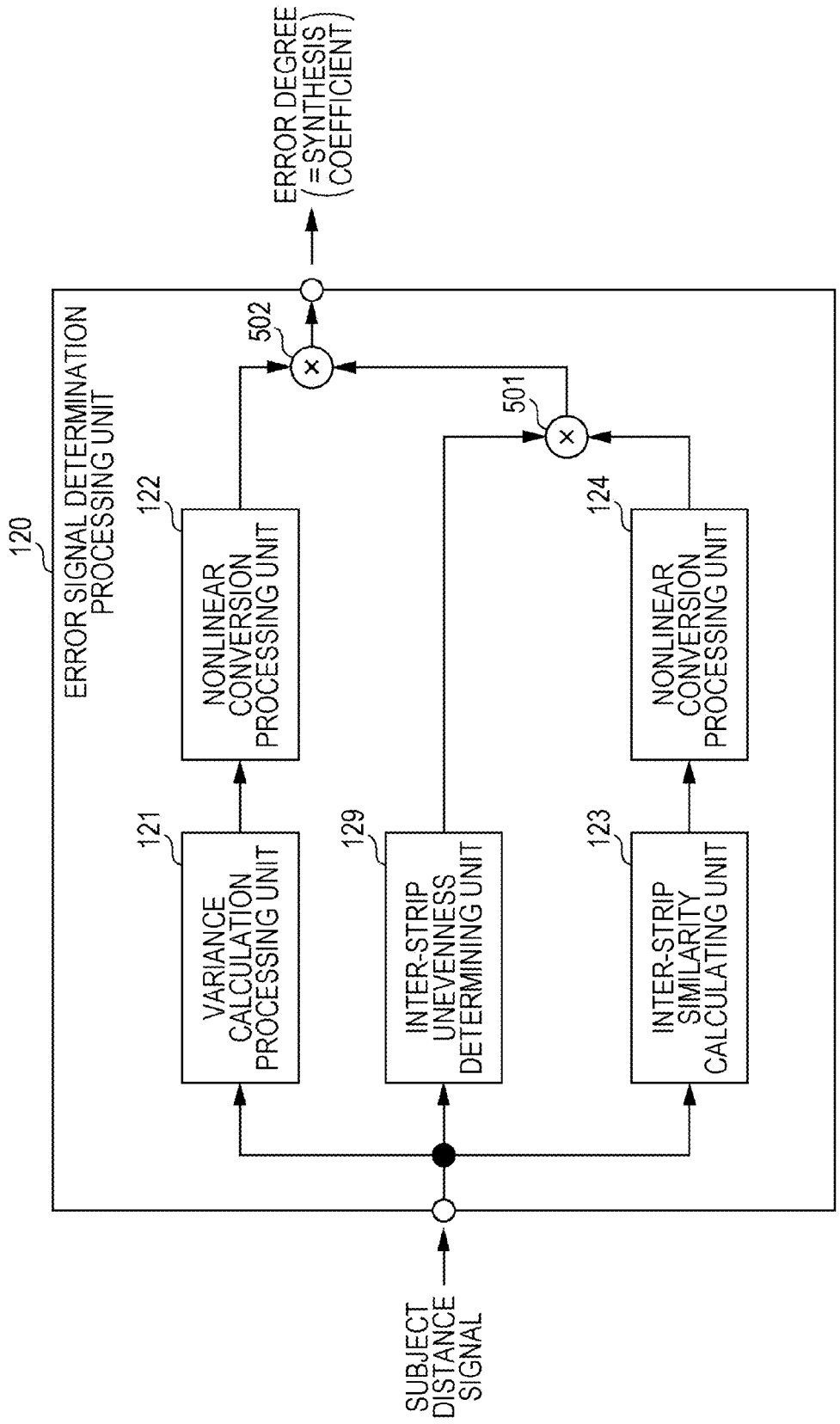
FIG. 15 is a diagram illustrating an example of an error signal determination processing unit.

Previously, examples of three types of error signal determination processes have been shown; however, it is also possible to use all of them. FIG. 15 shows a configurational example of the error signal determination processing unit 120.

The error signal determination processing unit 120 shown in FIG. 15 adopts a configuration in which the following are set in parallel:

(a) in a [first configurational example of an x. error signal determination processing unit], the variance calculating processing unit 121 and the nonlinear conversion processing unit 122 described with reference to FIG. 3, (b) in a [second configurational example of an x. error signal determination processing unit], the inter-strip similarity calculating unit 123 and the nonlinear conversion processing unit 124 described with reference to FIG. 11, and (c) in a [third configurational example of an x. error signal determination processing unit], the inter-strip unevenness determining unit 129 described with reference to FIG. 13.

In the present embodiment, since the output of the error determination processes of the above-described (a) to (c) are set to a range of 0.0 to 1.0 and the degree of error is set to be strongest at 1.0, the multiplication of the respective outputs is computed in multiplication units 501 and 502, and it is possible to output the computed result as the error determination result to the distance image synthesis unit 140 to be set as the synthesis coefficient (err).

Here, other configurations are also possible, for example, configurations applying an arbitrary coefficient to the respective degrees of error, weighting the degrees of error, and performing matching with the error characteristic of the input distance signal may be adopted.

[8. Configuration Example of Edge Preservation Type LPF]

As described with reference to FIG. 2, in the distance image synthesis unit 140, the processing target image synthesized according to the synthesis coefficient (err) is the following two images:

(1) input distance image 110 (=Din), and
(2) filter-processed image (=DinLPFed) outputted by the edge preservation type LPF processing unit.

In the edge preservation type LPF processing unit 160, an edge preservation type filter application process is performed with the aim of reducing the noise included in the distance image 110.

Figure 16:
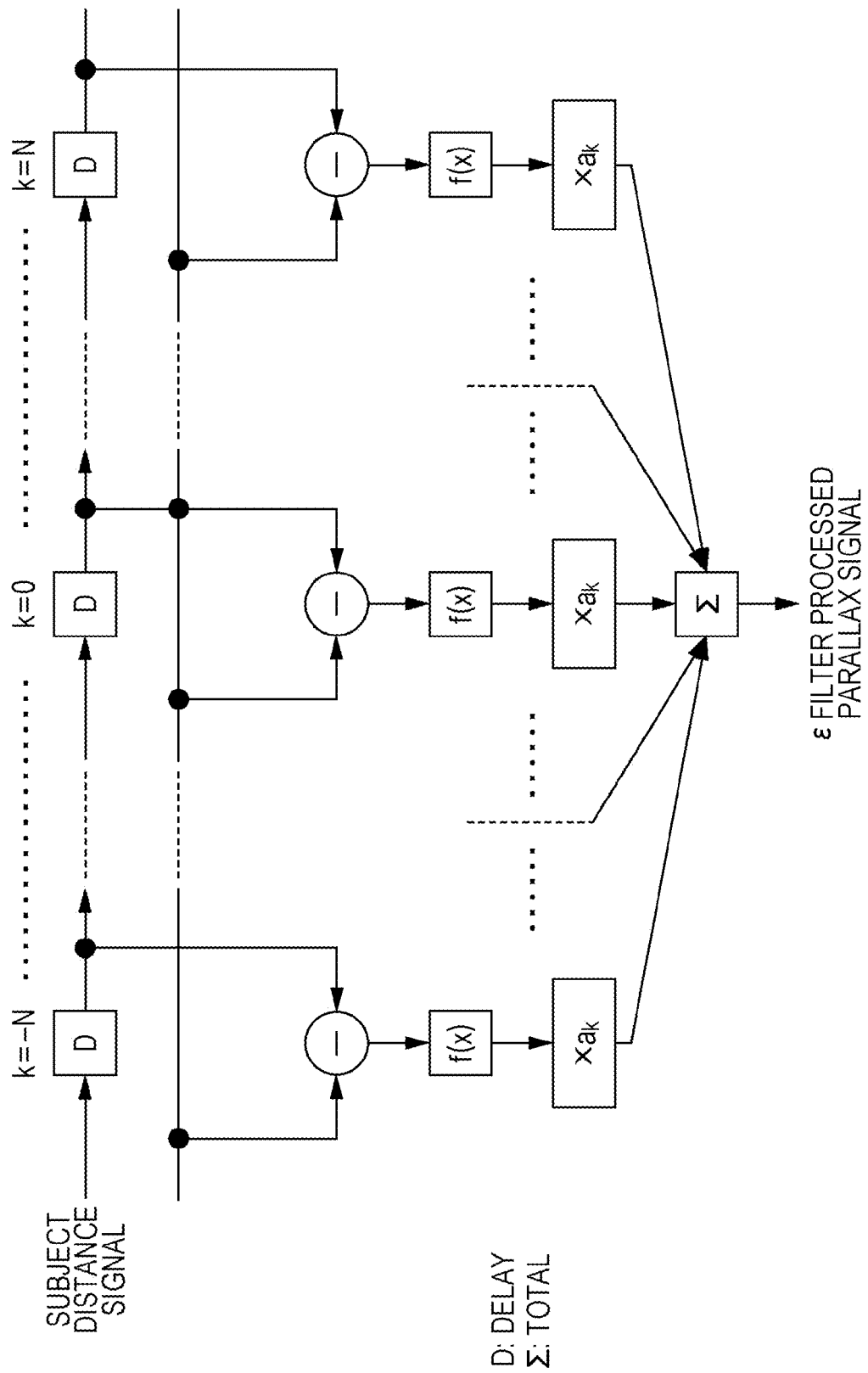
FIG. 16 is a diagram illustrating an example of an edge preservation type LPF processing unit.

As an example of the filter to which this process is to be applied, FIG. 16 shows a configurational example of an $\epsilon$ filter.

The $\epsilon$ filter is a filter defined by the following (Formula 6) when the input pixel value is set as x(n) and the output pixel value is set as y(n).

$$y(n) = x(n) - \sum_{k=-N}^{N} a_k \cdot f\{x(n) - x(n-k)\} \quad \text{(Formula 6)}$$

Here, f( ) is a function defined in the following (Formula 7).

$$f(x) = \begin{cases} x(n) - x(n-k) & |x(n) - x(n-k)| \le \varepsilon \\ \alpha & \text{otherwise} \end{cases} \quad \text{(Formula 7)}$$

$\alpha$ in the above-described (Formula 7)
is able to be defined as $\alpha=0$ or $\alpha=\epsilon$.
In addition,
$a_k$ shown in the above-described (Formula 6) is a filter coefficient of a non-recursive linear low pass filter (FIR filter) and the sum is set to be 1.0 in order to preserve the DC component.

The $\epsilon$ filter applied in the edge preservation type LPF processing unit 160 has the configuration shown in FIG. 16. The example shown in FIG. 16 is a block diagram configuring an N×2+1TAP $\epsilon$ filter and adopts the configuration of a general FIR filter.

The configuration of the $\epsilon$ filter takes the difference of the pixel value (distance signal) of the distance image held in the delay device D and the pixel value (distance signal) of the center in which k=0, performs calculation processing of function $a_k$×function f(x), and takes the total of the tap length.

Figure 17:
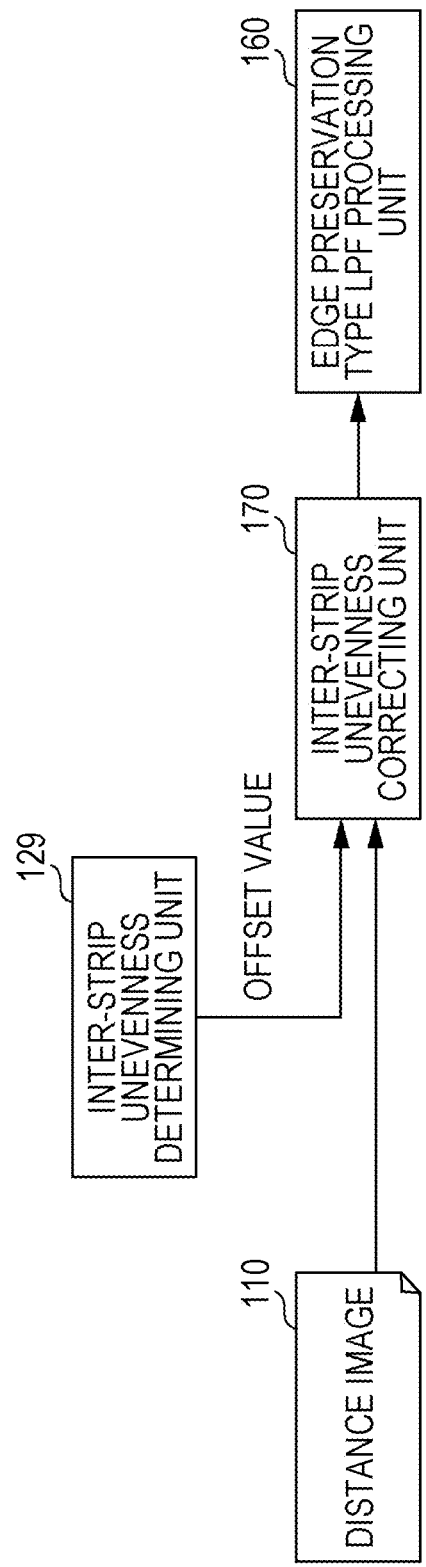
FIG. 17 is a diagram illustrating an example of the edge preservation type LPF processing unit.

FIG. 17 shows another configurational example of the edge preservation type LPF processing unit 160.

The configuration shown in FIG. 17 is applicable to the configuration having the inter-strip unevenness determining unit 129 described with reference to FIG. 13 and FIG. 14.

As shown in FIG. 17, as the input, rather than the distance image 110, the edge preservation type LPF processing unit 160 inputs a distance image corrected in the inter-strip unevenness correction unit 170 according to the offset value determined by the inter-strip unevenness determining unit 129.

Figure 18:
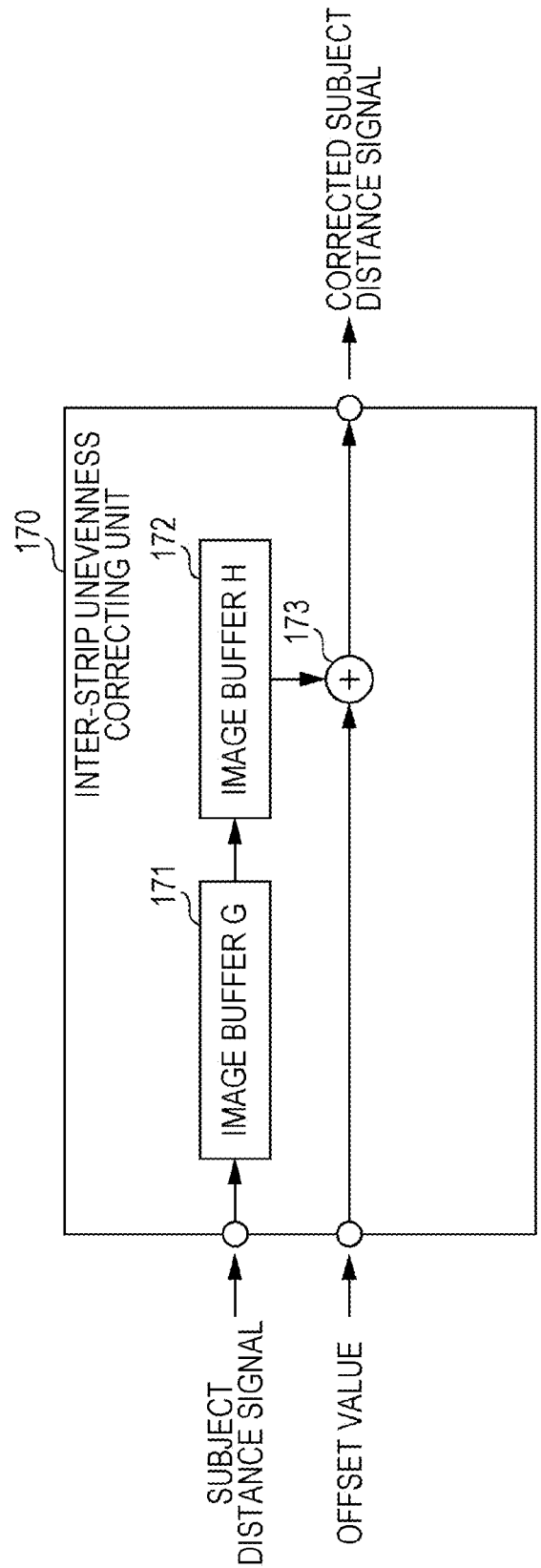
FIG. 18 is a diagram illustrating a configurational example of an inter-strip unevenness correction unit.

FIG. 18 shows a configurational example of the inter-strip unevenness correction unit 170.

The inter-strip unevenness correction unit 170 sequentially inputs the distance signal of the distance image in horizontal line units and inputs the offset value generated by the inter-strip unevenness determining unit 129.

The input distance signal is sent to the image buffer G171 and the image buffer H172 in processing line units.

The widths of the respective buffers are the same widths as the image buffer D131 and image buffer E132 of the inter-strip unevenness determining unit 129 described with reference to FIG. 14 previously, and are configured such that the correction value determined by the inter-strip unevenness determining unit is reflected upon the distance signal of the same strip.

With respect to the distance signal of the distance image of the strip units output from the image buffer H172, an offset added distance image to which the offset value determined by the inter-strip unevenness determining unit 129, that is, the offset value computed according to (Formula 5) described previously is added is generated and output to the edge preservation type LPF processing unit 160.

The edge preservation type LPF processing unit 160 performs a noise reduction process applying the edge preservation type noise reduction processing filter with respect to the offset added distance image. By adding the offset added distance image generating process, the noise reduction effect is increased and the correction effect of the error signal in the subsequent synthesis process is further increased.

[9. Example of Application Applying a Corrected High Precision Distance Image Obtained by the Processes of an Embodiment of the Present Disclosure]

Next, description will be given of an example of an application applying a corrected high precision distance image or a parallax image obtained by the processes of an embodiment of the present disclosure. Here, the distance image (parallax image) is capable of being applied to various applications of devices such as digital cameras, camcorders, mobile phones, gaming devices, content editing equipment, PCs, and TVs. Below, description will be given of an example of a part thereof.

Figure 19A:
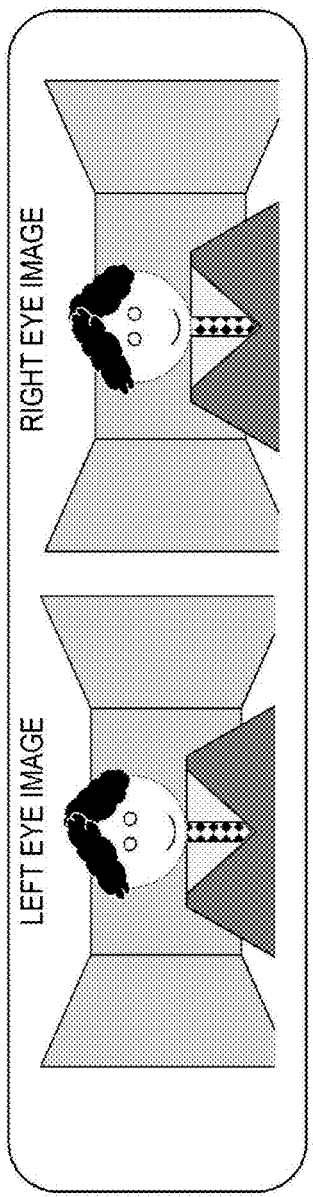
FIGS. 19A-E are diagrams illustrating a processing example applying a corrected distance image generated by the image processing apparatus of an embodiment of the present disclosure.
Figure 19C:
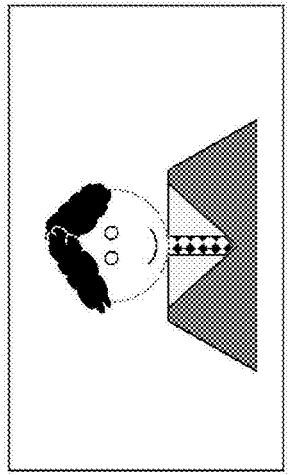
Figure 19E:
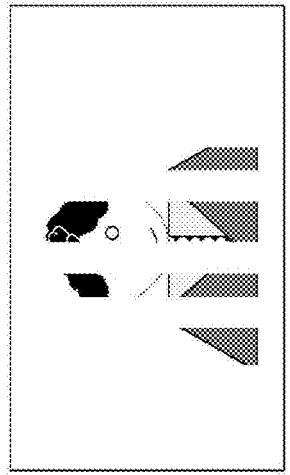
Figure 19B:
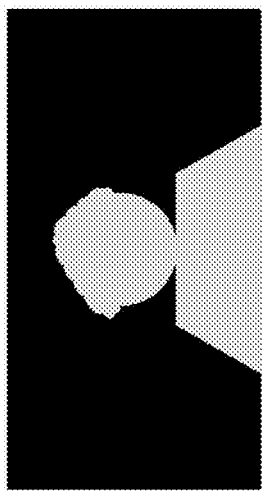

As an example, a left eye image and a right eye image are input as shown in FIG. 19A and the distance image shown in FIG. 19B is determined.

Next, description will be given of an application in which the subject and background are separated based on the distance information of the above (B) distance image, and only the subject is output as in FIG. 19C.

First, description will be given of the process sequence determining the distance image (=parallax image) with reference to the flowchart shown in FIG. 20.

For example, the above process is capable of being executed in a data processing unit in an image processing apparatus such as a PC, that is, a data processing unit provided with a CPU or the like executing a program according to a sequence defined in advance.

First, in step S101, a stereo image configured by a left eye image and a right eye image as shown in FIG. 19A is input. Next, in step S102, a parallax detection process applying the input stereo image, that is, the left eye image and the right eye image, is performed, and the computation of the subject distance according to the detected parallax information is performed. The parallax and subject distance are, for example, computed in the pixel units of the left eye image or the right eye image.

Next, in step S103, a distance image in which a pixel value signal of shading or the like reflecting the distance signal computed in the pixel units is set is generated.

Subsequently, with reference to the flowchart shown in FIG. 21, description will be given of a process of using the generated distance image and separating the subject.

That is, the process uses the distance image shown in FIG. 19B and generates the subject-separated image shown in FIG. 19C.

This process is also capable of being executed in a data processing unit in an image processing apparatus such as a PC, that is, a data processing unit provided with a CPU or the like executing a program according to a sequence defined in advance.

Figure 20:
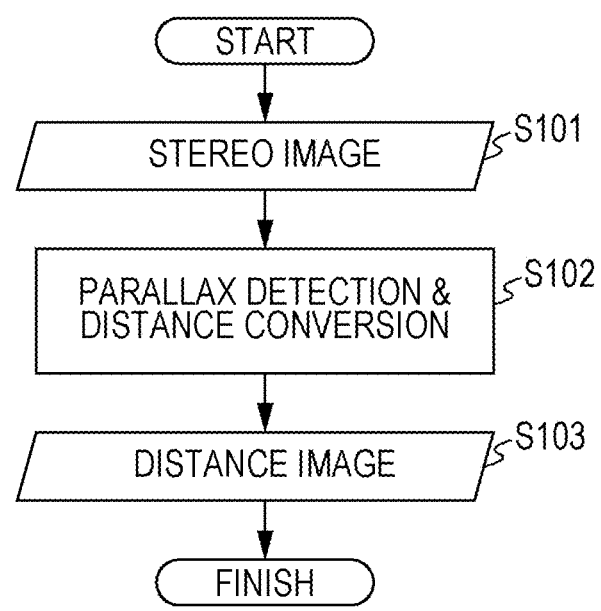
FIG. 20 is a diagram showing a flowchart illustrating a generation sequence of a distance image.

In steps S111 and S112, the left (or right) eye image and a distance image determined according to the sequence described with reference to FIG. 20 are input.

Next, in step S113, the distance of the pixels is acquired from the distance image in the pixel units of the left (or right) eye image.

Next, in step S114, the distance of the pixel units is compared with a threshold (th) set in advance.

In step S114, for a pixel region for which it is determined that the distance is the threshold (th) or less, the region is determined to be a subject region located closer than a predetermined distance, the process proceeds to step S115, and a pixel is output.

Meanwhile, in step S114, for a pixel region for which it is determined that the distance is greater than the threshold (th), the region is determined to be a subject region located further away than a predetermined distance, the process proceeds to step S116, and a transparent pixel (without setting of the pixel value, or with a pixel value of one color such as black or white) is output.

In step S117, it is determined for all the pixels whether or not the processing has finished, and, when the processing has finished for all the pixels, the processing finishes.

According to this process, for example, as shown in FIG. 19B, if no errors are included in the distance image, it is possible to cut out a specific subject as shown in FIG. 19C.

Figure 19D:
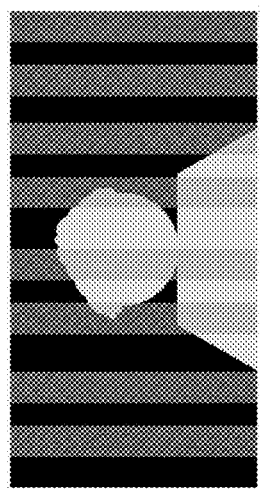
Figure 21:
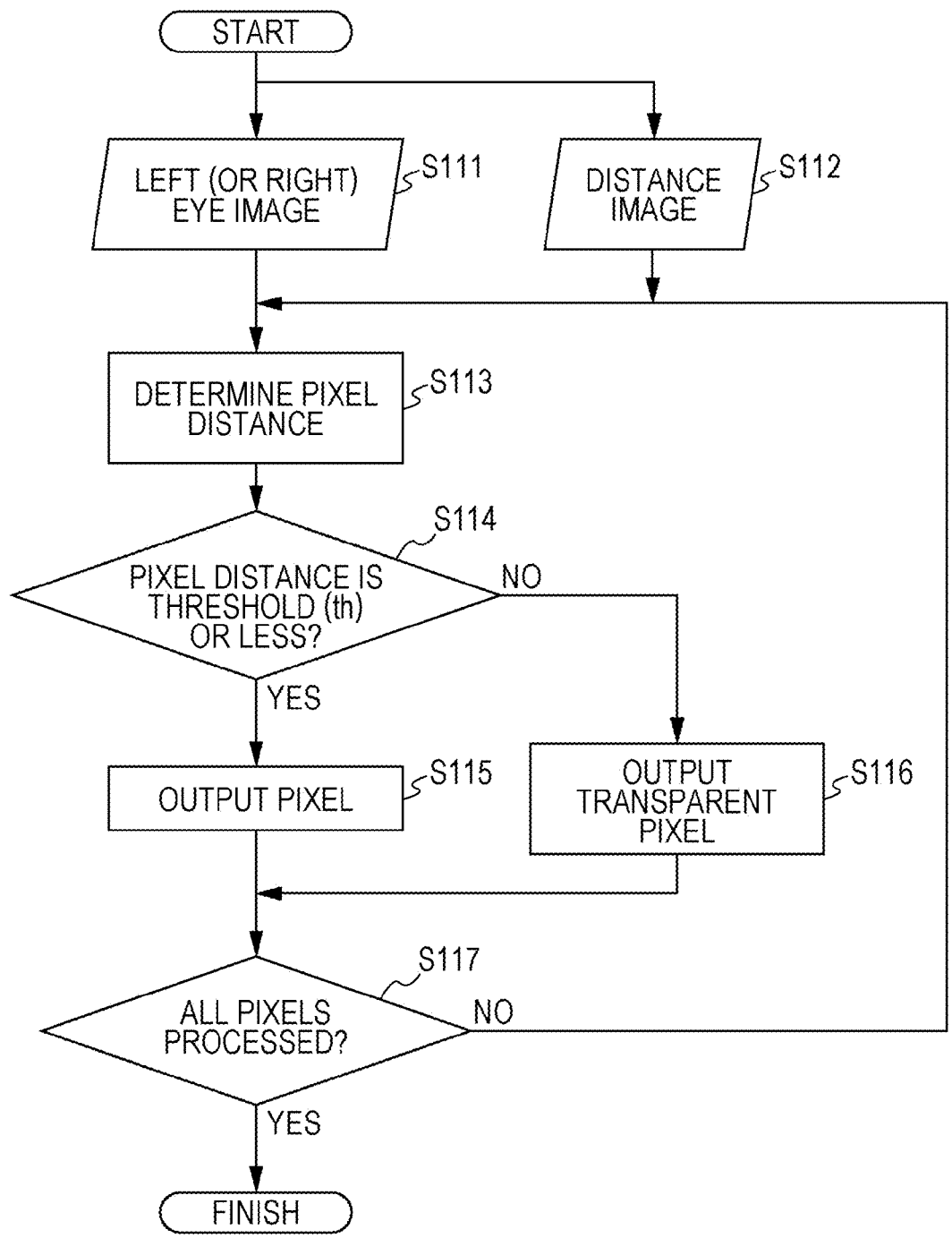
FIG. 21 is a diagram showing a flowchart illustrating a sequence of a process of cutting out a subject to which a subject distance obtained from a distance image is applied.

However, normally, as in the distance image shown in FIG. 19D, errors are included in the distance image, and when a distance image including such errors is applied, even when the process according to the flow shown in FIG. 21 is performed, for example, it is impractical to perform correct cutting out of the subject as shown in FIG. 19E.

However, using the image processing apparatus of an embodiment of the present disclosure described with reference to FIG. 2 onwards, correction of the distance image including errors is performed, an accurate distance image (=parallax image) is determined, and the flow shown in FIG. 21 applying the corrected distance image is performed, whereby it is possible to perform correct cutting out of a specific subject as shown in FIG. 19C.

Figure 22:
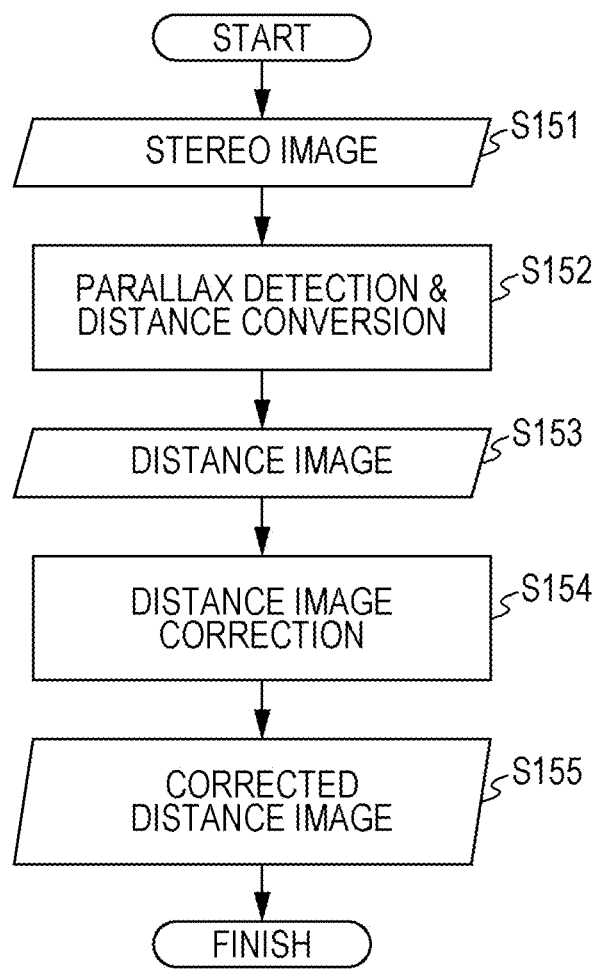
FIG. 22 is a diagram showing a flowchart illustrating a correction processing sequence of a distance image.

Description will be given of the sequence of the correction process of the distance image including errors performed by the image processing apparatus of an embodiment of the present disclosure with reference to the flowchart shown in FIG. 22.

First, in step S151, a stereo image configured by a left eye image and a right eye image as shown in FIG. 19A is input. Next, in step S152, a parallax detection process applying the input stereo image, that is, the left eye image and the right eye image, is performed, and the computation of the subject distance according to the detected parallax information is performed. The parallax and subject distance are, for example, computed in the pixel units of the left eye image or the right eye image.

Next, in step S153, a distance image in which a pixel value signal of shading or the like reflecting the distance signal computed in the pixel units is set is generated.

There is a possibility that errors may be included in the distance image.

Here, in the configuration previously described with reference to FIG. 2, description has been given of a configuration inputting an already generated distance image and performing a correction process; however, a configuration having a distance image generating unit performing the processes of steps S151 to S153 of the flow shown in FIG. 22 may be adopted. In such a case, the distance image is not input to the image processing apparatus and only the left eye image and the right eye image are input as the stereo image.

The distance image correction process of step S154 is a distance image correction process performed in the image processing apparatus described with reference to FIGS. 2 to 18.

According to the distance image correction process, the errors included in the distance image are removed or reduced, whereby a high precision corrected distance image is generated.

In step S155, the corrected distance image is output.

By applying the corrected distance image and performing processing according to the flow shown in FIG. 21 described previously, it is possible to more accurately perform the subject cutting out process according to the distance.

[10. Summary of Configuration of Present Disclosure]

Above, detailed description has been given of the embodiments of the present disclosure while referring to specific embodiments. However, it is clear that those skilled in the art may make modifications and substitutions to these embodiments in a range not departing from the spirit of the embodiments of the present disclosure. That is, the present disclosure has been disclosed in the form of examples, which should not be interpreted as limiting. In order to determine the spirit of the embodiments of the present disclosure, refer to the section of the Claims.

Here, the techniques disclosed in this specification are capable of adopting the following configuration.

(1) An image processing apparatus including:

an error determination processing unit inputting a distance image having distance information or parallax information up to the subject, detecting an error signal included in the distance image, and outputting a synthesis coefficient according to an error degree of an image region unit;

a low pass filter processing unit applying a low pass filter with respect to the distance image and generating a noise reduction distance image; and a distance image synthesis unit generating a corrected distance image using a synthesis process of the distance image and the noise reduction distance image, in which the distance image synthesis unit performs a synthesis process in which the synthesis ratio of the distance image and the noise reduction image is set in the image region units according to a synthesis coefficient of an image region unit output by the error determination processing unit, and generates the corrected distance image.

(2) The image processing apparatus according to (1) in which the error determination processing unit includes a variance calculating processing unit computing a variance of divided region units of the distance image, and a nonlinear conversion processing unit computing the synthesis coefficient using a nonlinear conversion process of the variance of the divided region units computed by the variance calculating processing unit.

(3) The image processing apparatus according to (1) or (2) in which the error determination processing unit includes an inter-strip similarity calculating unit determining the similarity between strip regions which are separated regions in which the distance image is separated unevenly or evenly at arbitrary widths in a lateral (horizontal) direction, and a nonlinear conversion processing unit computing the synthesis coefficient using a nonlinear conversion process of the inter-strip similarity computed by the inter-strip similarity calculating unit.

(4) The image processing apparatus according to (3) in which the strip regions have the same width as the width of strips used at the time of generation processing of a stereo image configured by a left eye image and a right eye image applied in a three-dimensional image display.

(5) The image processing apparatus according to (3) or (4) in which the inter-strip similarity calculating unit computes the sum of absolute differences (SAD) of the distance signals between every other strip region in the distance image as the inter-strip similarity.

(6) The image processing apparatus according to (1) in which the error determination processing unit includes an inter-strip unevenness determining unit detecting a state of unevenness of signal values between strip regions which are separated regions in which the distance image is separated unevenly or evenly at arbitrary widths in a lateral (horizontal) direction, and generating and outputting a synthesis coefficient reflecting the error degree.

(7) The image processing apparatus according to (6) in which the inter-strip unevenness determining unit computes an average value of distance signals of three consecutive strip regions in the distance image, computes two differences of signal average values between adjacent strips from the three computed signal average values, determines the presence or absence of inter-strip unevenness based on the two computed differences, and generates and outputs a synthesis coefficient according to the determination result.

(8) The image processing apparatus according to (6) or (7) in which the inter-strip unevenness determining unit computes and outputs an offset value for making average values of distance signals of three consecutive strip regions flat.

(9) The image processing apparatus according to any one of (1) to (8) in which the low pass filter processing unit performs an edge preservation type noise reduction process.

In addition, the configuration of an embodiment of the present disclosure includes a method of processing performed in the above-mentioned apparatus or the like and program executing such processes.

In addition, the series of processes described in the specification is capable of being executed using hardware, software, or a configuration combining both. In a case where the processes are performed using software, it is possible to install and execute a program recording the process sequence in the memory in the computer built into dedicated hardware, or to install and execute a program in a general-purpose computer capable of executing various types of processes. For example, it is possible to record the program on a recording medium in advance. Other than installation onto a computer from a recording medium, it is possible to transmit a program through a network such as a LAN (Local Area Network) or the Internet and perform installation onto a recording medium such as a built-in hard disk or the like.

Here, each type of process described in the specification may be performed in parallel or individually according to necessity or the processing power of the apparatus performing the processes, without only being performed in time series according to the description. In addition, the system in the present specification is a logical group configuration of a plurality of apparatuses, and none of the apparatuses of the configuration are limited to being provided in the same housing.

The present disclosure contains subject matter related to that disclosed in Japanese Priority Patent Application JP 2011-261034 filed in the Japan Patent Office on Nov. 29, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an error determination processing unit inputting a distance image having distance information or parallax information up to a subject, detecting an error signal included in the distance image, and outputting a synthesis coefficient according to an error degree of an image region unit;
a low pass filter processing unit applying a low pass filter with respect to the distance image and generating a noise reduction distance image; and
a distance image synthesis unit generating a corrected distance image using a synthesis process of the distance image and the noise reduction distance image,
wherein the distance image synthesis unit performs a synthesis process in which a synthesis ratio of the distance image and the noise reduction image is set in the image region unit according to a synthesis coefficient of an image region unit output by the error determination processing unit, and generates the corrected distance image.

2. The image processing apparatus according to claim 1, wherein the error determination processing unit includes
a variance calculating processing unit computing a variance of divided region units of the distance image, and
a nonlinear conversion processing unit computing the synthesis coefficient using a nonlinear conversion process of the variance of the divided region units computed by the variance calculating processing unit.

3. The image processing apparatus according to claim 1, wherein the error determination processing unit includes:
an inter-strip similarity calculating unit determining an inter-strip similarity between strip regions which are separated regions in which the distance image is separated unevenly or evenly at arbitrary widths in a lateral (horizontal) direction, and
a nonlinear conversion processing unit computing the synthesis coefficient using a nonlinear conversion process of the inter-strip similarity computed by the inter-strip similarity calculating unit.

4. The image processing apparatus according to claim 3, wherein the strip regions have the same width as the width of strips used at the time of generation processing of a stereo image configured by a left eye image and a right eye image applied in a three-dimensional image display.

5. The image processing apparatus according to claim 3, wherein the inter-strip similarity calculating unit computes the sum of absolute differences (SAD) of distance signals between every other strip region in the distance image as the inter-strip similarity.

6. The image processing apparatus according to claim 1, wherein the error determination processing unit includes an inter-strip unevenness determining unit detecting a state of unevenness of signal values between strip regions which are separated regions in which the distance image is separated unevenly or evenly at arbitrary widths in a lateral (horizontal) direction, and generating and outputting a synthesis coefficient reflecting the error degree.

7. The image processing apparatus according to claim 6, wherein the inter-strip unevenness determining unit computes an average value of distance signals of three consecutive strip regions in the distance image, computes two differences of signal average values between adjacent strips from the three computed signal average values, determines the presence or absence of inter-strip unevenness based on the two computed differences, and generates and outputs a synthesis coefficient according to a determination result.

8. The image processing apparatus according to claim 6, wherein the inter-strip unevenness determining unit computes and outputs an offset value for making average values of distance signals of three consecutive strip regions flat.

9. The image processing apparatus according to claim 8, wherein the low pass filter processing unit applies the offset value and generates a noise reduction distance image by applying the low pass filter with respect to a distance image for which a correction process making the average values of distance signals of three consecutive strip regions flat has been performed.

10. The image processing apparatus according to claim 1, wherein the low pass filter processing unit performs an edge preservation type noise reduction process.

11. An image processing method performed in an image processing apparatus, the method comprising:
inputting a distance image having distance information or parallax information up to a subject, detecting an error signal included in the distance image, and outputting a synthesis coefficient according to an error degree of an image region unit;
applying a low pass filter with respect to the distance image and generating a noise reduction distance image; and
generating a corrected distance image using a synthesis process of the distance image and the noise reduction distance image,
wherein in the generating of the corrected distance image a synthesis process in which a synthesis ratio of the distance image and the noise reduction image is set in the image region unit is performed according to a synthesis coefficient of an image region unit output in the inputting of the distance image, and the corrected distance image is generated.

12. At least one non-transitory computer-readable medium including a program which, when executed, causes an image processing apparatus to execute image processing comprising:
inputting a distance image having distance information or parallax information up to a subject, detecting an error signal included in the distance image, and outputting a synthesis coefficient according to an error degree of an image region unit;
applying a low pass filter with respect to the distance image and generating a noise reduction distance image; and
generating a corrected distance image using a synthesis process of the distance image and the noise reduction distance image,
wherein, in the generating of corrected distance image a synthesis process in which a synthesis ratio of the distance image and the noise reduction image is set in the image region unit is performed according to a synthesis coefficient of an image region unit output in the inputting of the distance image, and the corrected distance image is generated.

\* \* \* \* \*